(12) United States Patent
Bergh

(10) Patent No.: US 8,610,995 B2
(45) Date of Patent: Dec. 17, 2013

(54) OCCASIONAL CALIBRATION PHASE-DIFFERENCE MODULATION FOR SAGNAC INTERFEROMETER

(76) Inventor: Ralph A. Bergh, Lititz, PA (US)

( * ) Notice: Subject to any disclaimer, the term of this patent is extended or adjusted under 35 U.S.C. 154(b) by 89 days.

(21) Appl. No.: 13/388,924

(22) PCT Filed: Jul. 14, 2010

(86) PCT No.: PCT/US2010/041949
§ 371 (c)(1),
(2), (4) Date: Feb. 3, 2012

(87) PCT Pub. No.: WO2012/008955
PCT Pub. Date: Jan. 19, 2012

(65) Prior Publication Data
US 2012/0134005 A1    May 31, 2012

(51) Int. Cl.
*G02F 1/01*    (2006.01)

(52) U.S. Cl.
USPC .......................................................... 359/279

(58) Field of Classification Search
USPC .......................................................... 359/279
See application file for complete search history.

(56) References Cited

U.S. PATENT DOCUMENTS

| | | |
|---|---|---|
| 4,299,490 A | 11/1981 | Cahill et al. |
| 4,634,282 A | 1/1987 | Shaw et al. |
| 4,702,600 A | 10/1987 | Handrich et al. |
| 4,869,592 A | 9/1989 | Bergh |
| 5,141,316 A | 8/1992 | Lefevre et al. |
| 5,181,078 A * | 1/1993 | Lefevre et al. .............. 356/464 |
| 5,485,274 A * | 1/1996 | Kemmler ..................... 356/464 |
| 7,167,250 B2 * | 1/2007 | Chen et al. ................... 356/464 |
| 2002/0146226 A1 | 10/2002 | Davis et al. |
| 2003/0202187 A1 * | 10/2003 | Lange et al. ................. 356/464 |
| 2008/0218765 A1 | 9/2008 | Bergh |

FOREIGN PATENT DOCUMENTS

| | | |
|---|---|---|
| WO | WO0216985 A1 | 2/2002 |
| WO | WO2007143369 A1 | 12/2007 |

OTHER PUBLICATIONS

Herve Lefever, "The Fiber-Optice Gyroscope," Artech House (1992).
"Optical Fiber Rotation Sensing," Edited by William K. Burns, Academic Press (1993).

* cited by examiner

*Primary Examiner* — James Jones
(74) *Attorney, Agent, or Firm* — George A. Leone; Citadel Patent Law

(57) ABSTRACT

An occasional calibration waveform is used to, first, make an interferometer sensitive to small changes in Sagnac phase difference due to rotating the gyroscope (this is commonly referred to as biasing the interferometer); second, supply a feedback phase difference to keep the interferometer sensitive to small changes in rotation rate; and third, supply the calibration modulation necessary to keep the digital electronics calibrated with respect to the Sagnac phase difference being measured.

37 Claims, 20 Drawing Sheets

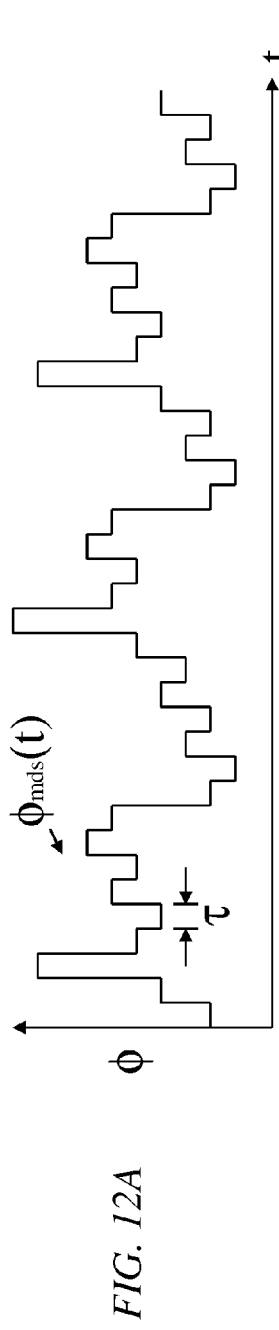
FIG. 12A
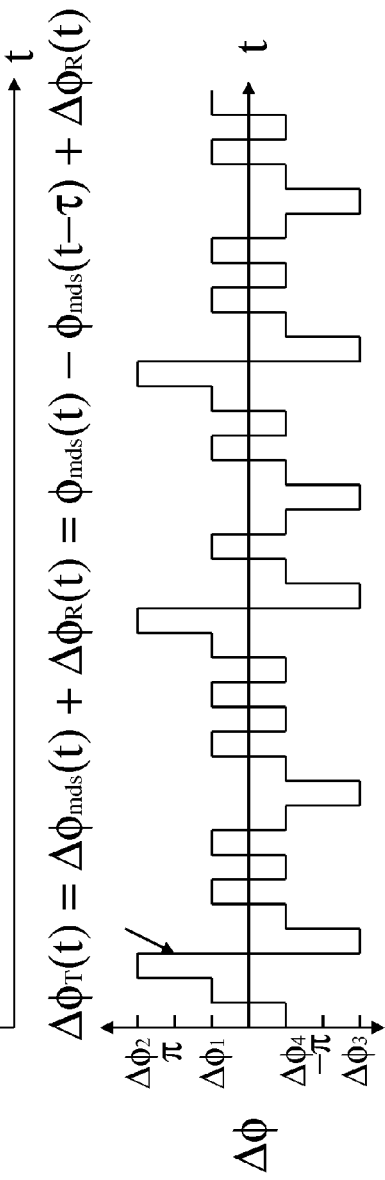
$$\Delta\phi_T(t) = \Delta\phi_{mds}(t) + \Delta\phi_R(t) = \phi_{mds}(t) - \phi_{mds}(t-\tau) + \Delta\phi_R(t)$$
FIG. 12B
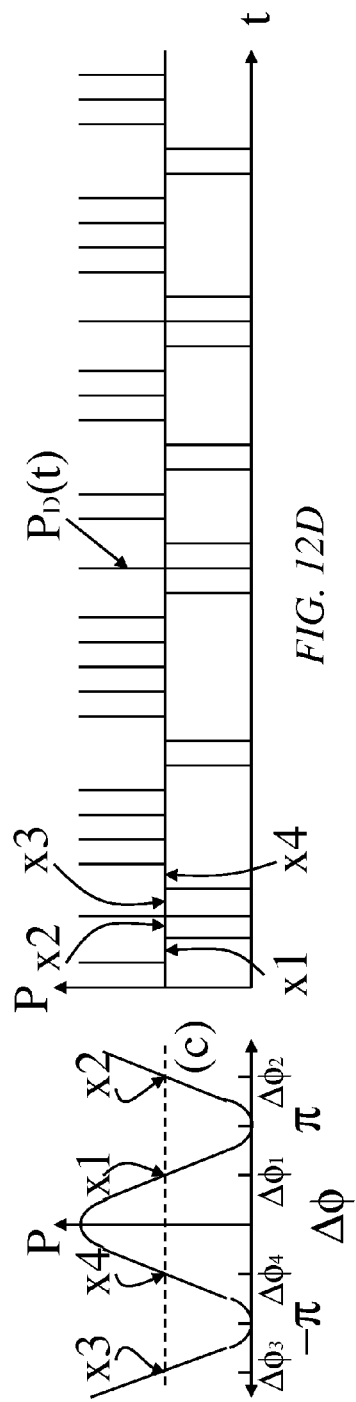
FIG. 12C
FIG. 12D

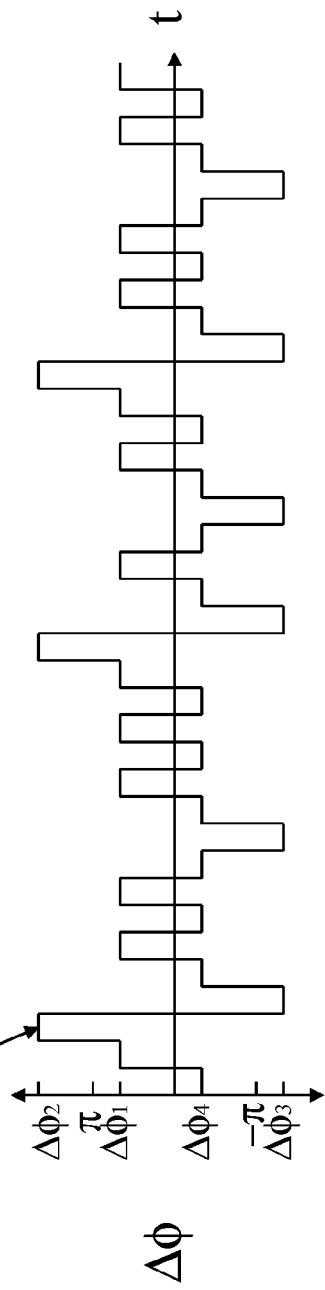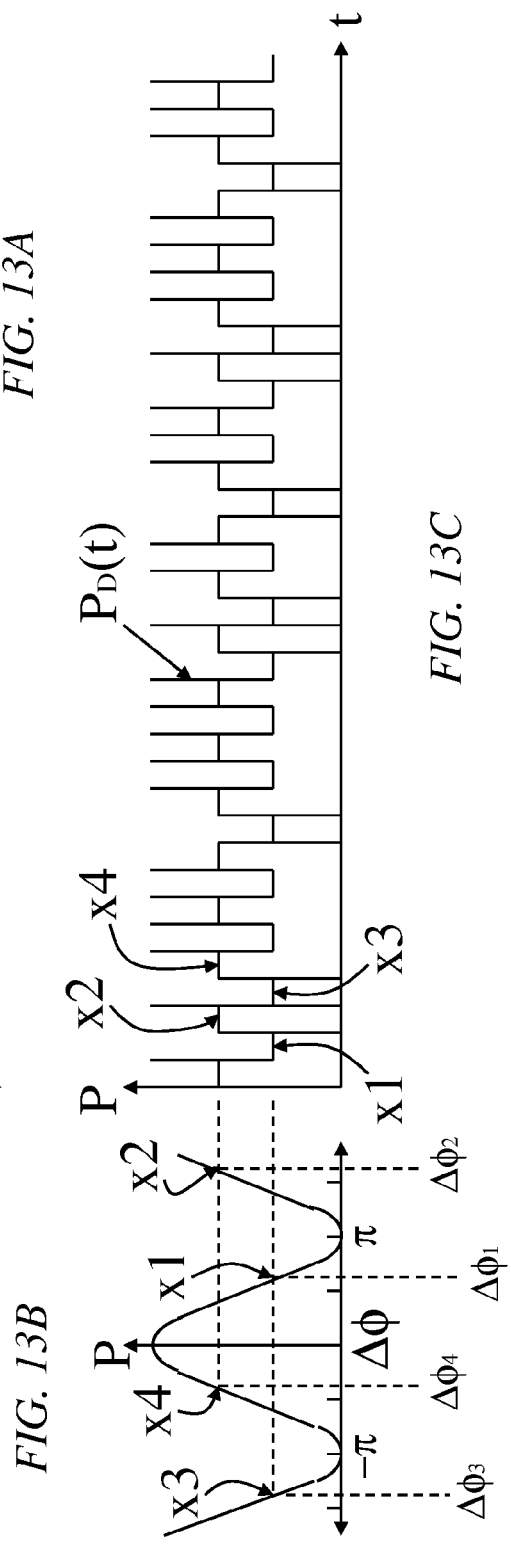
FIG. 13A
FIG. 13B
FIG. 13C

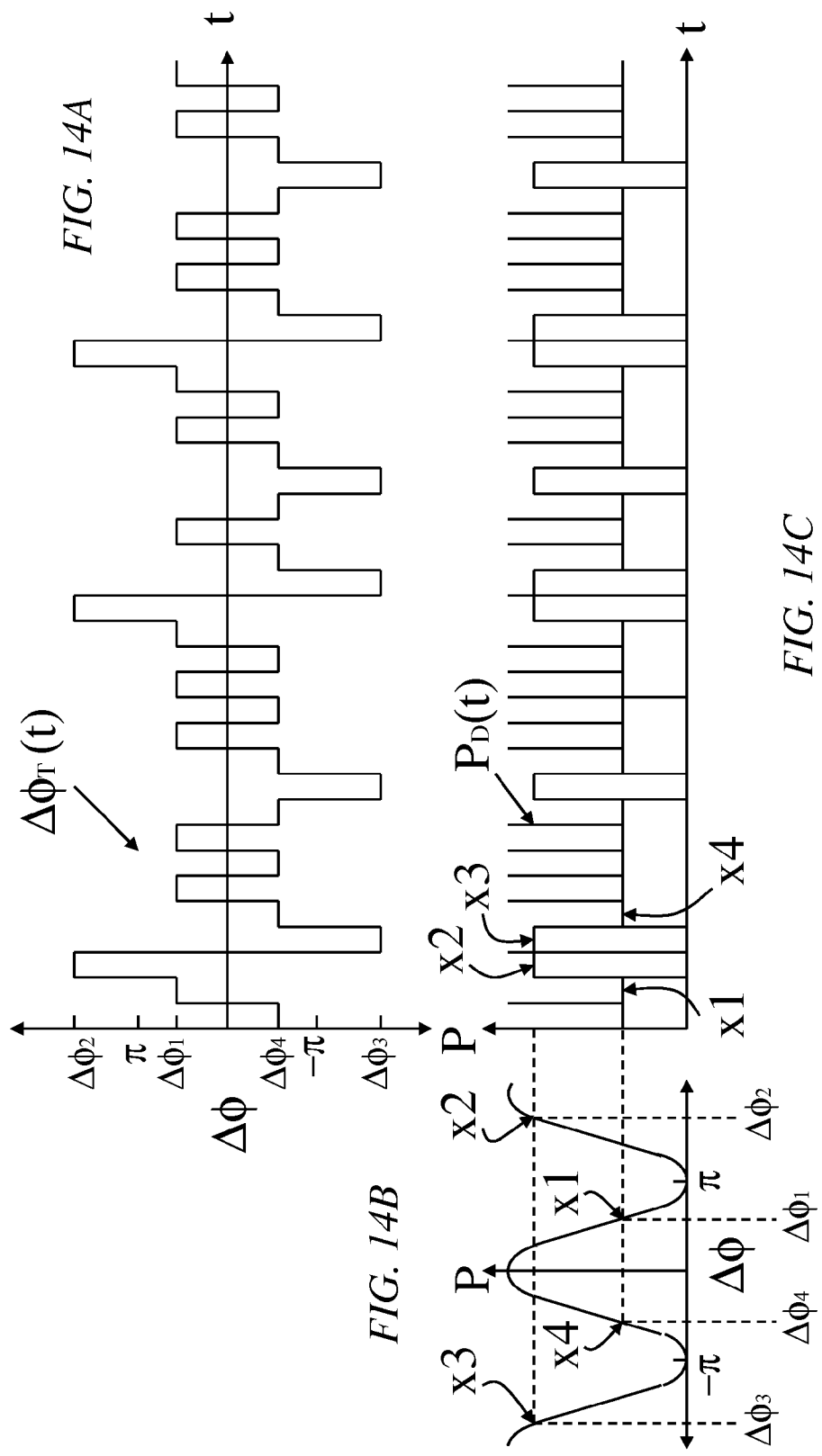

OCCASIONAL CALIBRATION PHASE-DIFFERENCE MODULATION FOR SAGNAC INTERFEROMETER

FIELD OF THE INVENTION

The present invention relates, in general, to gyroscopes and, more particularly, to closed-loop fiber optic gyroscopes and, even more particularly, closed-loop fiber optic gyroscopes using a Sagnac interferometer.

BACKGROUND OF THE INVENTION

A. Overview

A Sagnac interferometer comprises a splitting plate or other splitting device that divides an incident light wave into two lightwaves. The two waves thus created enter opposite ends of a single optical path formed into a loop. The two waves counter-propagate, pass through each other, and return to the splitting device. There they recombine and are sent to a detector where they produce interference that depends upon phase difference between the recombined waves.

Originally, mirrors defined the optical path of the Sagnac interferometers. It is now known that this optical path can be created using a single-mode optical fiber wound about an axis into a coil.

It is also known that rotating the coil about its axis changes the relative optical path lengths of the counter-propagating waves, engendering a phase difference between these waves when they recombine. The recombination of the two counter-propagated waves creates interference between them that is modified by their phase difference and thereby the rate of rotation of the fiber coil. This is known as the Sagnac effect. The measurement of this phase difference enables the rotation rate to be quantified.

Much work has been conducted in order to improve the sensitivity and accuracy of the rotation rate measurement performed with such a gyroscope. As regards this topic, it will for example be possible to consult the books "The Fiber-Optic Gyroscope" by Herve Lefevre, ARTECH HOUSE, 1992, and "Optical Fiber Rotation Sensing" edited by William K. Burns, ACADEMIC PRESS, 1993.

In particular, it has firstly been observed that the response furnished by the SAGNAC interferometer in its simplest form is $P(\Delta\phi) = P_0[1+\cos(\Delta\phi)]$ and hence that the sensitivity of this signal of detected optical power, $P(\Delta\phi)$, in the neighborhood of the phase difference $\Delta\phi=0$, is low. A graph of $P(\Delta\phi)$ versus $\Delta\phi$ is known as an interferogram. The sensitivity is also low near phase differences that are integer multiples of $\pi$ radians. A square wave phase difference modulation, with amplitude more or less $\pi/2$ has been used to displace the operating point and produce a periodic signal the amplitude of which, $S(\Delta\phi)$, is a sinusoidal function of the rotation rate, $S(\Delta\phi)=S_0[\sin(\Delta\phi)]$, and which can hence be exploited with greater sensitivity and stability near phase differences of zero, $\Delta\phi=0$, or integer multiples of $\pi$ radians.

It was later shown that the accuracy of the measurement is improved by the use of a zero method, also called closed-loop operation. According to this method, an additional so-called negative-feedback phase difference $\Delta\phi_{mR}$ is applied, and serves to compensate for phase difference $\Delta\phi_R$ produced by the rotation rate. The sum of these two phase-differences, $\Delta\phi_{mR}$ and $\Delta\phi_R$, is kept null, thus enabling the interferometer to be operated with maximum sensitivity over a wide range of rotation rates. The signal necessary for producing the negative-feedback phase difference $\Delta\phi_{mR}$ is then exploited to derive a measurement of rotation rate. The measurement is then stable and linear.

The slaving necessary for this closed-loop operation can be performed through a frequency offset as was done using acousto-optic modulators in U.S. Pat. No. 4,299,490. Use of a pure frequency-shifting device, such as the acousto-optic modulators, is simple in principle, but difficult in practice.

The difficulty in implementing the frequency shifter approach led to reconsideration of closing the loop using a phase modulator. A constant frequency offset is equivalent to a constant rate-of-change in phase, or, in other words, a ramp in phase vs. time with a constant slope. A phase modulator can generate a phase ramp for a short period of time, but it then reaches the limit of its capability. An instantaneous $2\pi$ shift in the phase is transparent to an optical wave, and therefore a serrodyne waveform, consisting of a ramp and fall-back, created by a phase modulator appears like a continuous phase ramp and therefore also like a frequency shift.

A problem with phase modulators is that each phase modulator produces a slightly different phase modulation for a given electronic drive signal. Furthermore, the amount of phase modulation changes depending upon the temperature. This leads to an inadequate knowledge of the phase shifts that are imparted to the counter-propagating waves, and manifests itself in an inadequate knowledge of the phase shift used to compensate for the Sagnac phase difference and a less than accurate $2\pi$ fall-back. To make an accurate determination of the phase shift, a second control loop is required.

The aforesaid second control loop has been implemented in different ways. All of these have in effect rendered the actual ratio of the phase modulation output to electronic input, i.e. the phase modulator transfer function, non-critical to the measurement of Sagnac phase difference. The second control loop calibrates the phase modulator transfer function against the response of the interferometer. If the second control loop works well, then the measurement becomes as good as the interferometer response, and therefore as good as fundamental parameters such as wavelength stability and fiber coil stability.

In the serrodyne approach, the signal following the fall back is used as the input to the second control loop. This signal indicates an error if the fall back differs from $2\pi$ radians, and thus it calibrates the phase modulator transfer function with respect to the optical signal.

In order to simplify the electronic hardware, and reduce cost, the detector output is digitized, signal processed, and converted back into an analog waveform to drive the phase modulator. The electronic signal processing may comprise a combination of analog signal-conditioning electronics, conversion electronics, and digital electronics. With this arrangement it is easier to change the level of the electronic drive waveform in discrete steps rather than continuously. In a Sagnac loop interferometer, phase modulation steps can provide a similar phase difference between the recombined counter-propagated waves as a continuous ramp. The continuous ramp and fall-back then becomes a series of steps and a fall-back. See, for example, U.S. Pat. Nos. 5,039,220, 5,141, 316, 5,181,078.

An alternative approach is called dual ramp feedback and it uses two phase ramps to shift the phase difference back and forth from $\pi$ radians to minus $\pi$ radians as described in U.S. Pat. No. 4,869,592. This approach has been implemented using largely analog electronics and two control loops, one for the plus $\pi$ phase difference and one for the minus $\pi$ phase difference. The staircase form of this phase modulation method amounts to taking two or more steps in each direction, i.e. up and down, sometimes referred to as "dual staircase modulation." The dual staircase modulation is distinguished from the staircase-and-fall-back method because the former takes two or more steps in each direction while the latter uses only a single step in the opposite direction of the staircase to keep the phase modulator and electronics within their ranges of operation. Illustrated in U.S. Pat. No. 6,744,519 is a version of the dual staircase modulation waveform.

The dual-staircase feedback is better than the continuous ramp up and ramp down, not only because of better compatibility with digital electronics, but also because the dual-staircase approach has a much shorter switching time between plus $\pi$ phase difference and minus $\pi$ phase difference relative to the dual-ramp approach. The switching time changes a couple of orders of magnitude from the order of microseconds, approximately the propagation time through the fiber loop, to a few nanoseconds, the rise time of the phase step.

B. Basic Fiber Gyroscope Design

Referring now to FIG. 1 a fiber-optic gyroscope 1 includes a quasi-monochromatic light source 15, that is most often a super-luminescent diode or a laser diode pumped erbium-doped optical fiber, and a single-mode fiber optic Sagnac loop interferometer, designated overall by the reference 10. The Sagnac loop interferometer 10 comprises a first beam splitter 19 and an optical path 20 constituted by a single-mode optical fiber wound into a coil. The incident light wave is divided into two waves by the beam splitter. The two waves thus created are fed into opposite ends of the optical fiber and propagate in opposite directions, or counter-propagate, through the fiber. The counter-propagating waves pass through each other and return to the beam splitter where they are each split again thereby creating four waves. Two of these four waves, a portion from each of the counter-propagated waves, combine with each other and return in the direction of the source of the incident wave while the other two combine with each other but exit the interferometer through the unused port of the first beam splitter 19 and are discarded.

The gyroscope 1 likewise comprises a detector 11 furnishing an electrical signal that is proportional to the optical power incident upon it. The optical power is a function of phase difference between the combined counter-propagated waves. In other words, the combined waves interfere with each other and the amount of the optical power at the detector is a function of the state of this interference. A graph of the detected optical power vs. total phase difference between the interfering waves is known as the interferogram, see FIG. 2, and also FIGS. 9C, 10B and 11B. The optical signal is furnished to the detector 11 via a second beam splitter 16 that can be constituted, for example, by a semi-transparent mirror.

In the optical path of the interferometer there is interposed a modulator 14 that, controlled on the basis of an electrical signal, imparts a phase shift $\phi_m(t)$ to both of the counter-propagating waves. The difference in the propagation time from the phase modulator to the detector in one direction around the loop versus the other is $\tau$, and therefore a modulation of $\phi_m(t)$ applied to both waves at the phase modulator 14 creates a phase difference $\Delta\phi_m(t)=\phi_m(t)-\phi_m(t-\tau)$ between the two waves at the detector 11. Phase modulation, $\phi_m(t)$, is distinguished from phase difference modulation, $\Delta\phi_m(t)$, in the discussion that follows. Phase modulation, $\phi_m(t)$, is added to the phase of each of the counter-propagating waves at the phase modulator 14. Phase difference modulation, $\Delta\phi_m(t)$, is the modulation of the difference between the phases of the two waves as they interfere with each other at the detector 11. The detected optical power is largely dependent upon the total phase difference, $\Delta\phi_T(t)$, between the interfering waves. The total phase difference is ideally the sum of the modulated phase difference plus the rotation-rate induced phase difference.

The operation of the interferometer is improved by interposing a polarizer 17 and a spatial filter 18 between the second beam splitter 16 and the first beam splitter 19. In a known manner, this spatial filter is constituted by a single-mode optical fiber. Light returning from the interferometer 10 must have a component of its polarization aligned with pass axis of the polarizer 17. Employing polarization-maintaining fiber with its axes of birefringence properly aligned will ensure that some light is passed by the polarizer 17 and delivered to the detector 11. If the pass axis of the polarizer 17 is vertical, and the slow axis of each of the fiber ends is vertical, and the first beam splitter 19 is relatively insensitive to the polarization of the light, or its birefringence axis is similarly aligned, then a large amount of the light returning to the polarizer 17 will pass through to the second beam splitter 16 and on to the detector 11.

The output of the detector 11 is prepared and digitized with an analog-to-digital converter 12. The proper signal preparation necessary to avoid excess errors in the digital conversion is described in the next subsection. Closed-loop signal processing and digital-to-analog conversion electronics, herein referred to as signal processor 13, provides negative feedback to control the phase modulator 14 as a function of the signal received from the detector 11. It also creates the bias modulation that is added to the feedback modulation. Finally it derives the rotation rate measurement value that is output for external use.

C. Analog-To-Digital Conversion

A block diagram of analog-to-digital conversion electronics 12 of FIG. 1 is shown in FIG. 3. The output of the detector 11 passes through an amplifier 21 and a low-pass filter 22 before reaching the analog-to digital converter (ADC) 23. Analog-to-digital conversion changes an electronic signal and electronic noise that accompanies the signal, but this change can be made to have almost negligible impact in the signal-to-noise ratio if three criteria are met. The first criterion is that the noise accompanying the analog signal must have a standard deviation that is larger than about one least significant bit (LSB) of the ADC 23. The amplifier 21 is used to increase both signal and noise that is output from the detector 11 to satisfy the first criterion. The second criterion is that the dynamic range of the signal and noise are smaller that the dynamic range of the ADC 23. Thus the amplifier is not allowed to over-amplify the signal and noise, and the ADC must have enough bits to measure the signal plus noise. The third criterion is that the low-pass filter 22 must attenuate the analog frequency components that are approximately equal to or greater than the sampling frequency of the ADC 23. These components are undesirable because high frequency analog noise can alias to low frequency digital noise by the digitization process.

Satisfying the above stated criteria renders sampling noise negligible relative to noise present in the analog signal. Moreover, additional digital filtering leads in this case to the same improvement in the signal-to-noise ratio as filtering would accomplish in analog mode. As a practical example, the sampling period is $\frac{1}{16}$ times the propagation time $\tau$, namely, for example $\tau=5$ microseconds for 1000 meters of fiber, and the sampling period is 0.31 microseconds. The Shannon criterion therefore imposes a large pass band on the signal to be sampled: it has to be equal to 1/(2 times the sampling period), namely 1.6 MHz in this example. In such a pass band the noise is relatively large: typically a standard deviation of $10^{-3}$ of the detected optical power, which corresponds to a phase shift of about $10^{-3}$ radians in the interferometer. Hence it is sufficient, in order not to lose sensitivity and in order to be able later to improve the signal to noise ratio by filtering, that the LSB correspond to this phase shift.

For its part, the high limit must be at least greater than the peak-to-peak value of the noise, namely about 8 times its standard deviation and hence 3 bits would suffice for sampling the noise alone. However, account must also be taken of the inherent variations in the signal: in closed-loop mode the latter is slaved to zero and would not therefore a priori lay claim to any variations but in practice the slaving deviates from zero during changes in the rotation rate, i.e. angular acceleration, and the dynamic range of the converter must be able to cope with these deviations. These variations therefore define the number of necessary bits. In practice 8 to 12 bits are sufficient at the converter level, whilst after digital filtering the dynamic range of the rotation rate measurement can be greater than 20 bits.

D. Closed-Loop Signal Processing and Digital-To-Analog Conversion Electronics

Closed loop signal processing block diagrams as well as digital-to-analog conversion electronics take different forms depending upon the loop closure approach. Two approaches are reviewed: first the staircase-and-fail-back approach and second the dual staircase approach. Each of these two approaches uses two control loops, but they have quite different configurations.

The staircase-and-fall-back approach has a first control loop to null the Sagnac phase difference and a second control loop to control the gain of the digital-to-analog conversion and phase modulation portions of the first control loop. I will refer to the first control loop of this approach as the rotation-rate control loop because it is responsive to the rotation rate. I will refer to the second control loop as the calibration control loop because it calibrates the digital values in the signal processing against the phase modulation of the optical wave.

The prior-art dual staircase approach also has two control loops, a first control loop to control the height of the up-steps to shift the total phase difference to plus π radians and a second to control the down steps to shift the total phase difference to minus π radians. When the gyroscope is rotating, the up-step height is not the same as the down-step height. Therefore there is a difference between the number of up steps and the number of down steps and this difference is used as a measure of rotation. The rotation rate measurement in both the dual-staircase approach and the staircase-and-fallback approach is largely independent of the phase modulator transfer function.

The signals involved in the above-mentioned control loops share the same path through most of the gyroscope. Their paths differ only within the closed loop signal processing and the digital-to-analog conversion electronics. To trace the common paths one can begin at the phase modulator 14, progress through the optics, through the detector 11, and through the analog-to-digital conversion electronics 12. The latter comprises the amplifier 21, the low-pass filter 22, and the ADC 23. The completion of the individual paths through the signal processing and through the digital-to-analog conversion electronics is discussed in detail in U.S. Pat. No. 7,505,139, issued Mar. 17, 2009, to Bergh, the inventor here. U.S. Pat. No. 7,505,139 (herein also referred to as the '139 patent) is incorporated herein by reference.

In prior art, the dual-staircase sections of the waveform occur one after another. The prior art approach has led to an unacceptable amount of measurement error in some gyroscopes. The present disclosure provides a new and novel process to accomplish this calibration task using an occasional dual-staircase waveform where two steps or more are taken in one direction and then two steps or more are taken in the other.

SUMMARY OF THE DISCLOSURE

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An occasional calibration waveform is used to, first, make an interferometer sensitive to small changes in Sagnac phase difference due to rotating the gyroscope (this is commonly referred to as biasing the interferometer); second, supply a feedback phase difference to keep the interferometer sensitive to small changes in rotation rate; and third, supply the calibration modulation necessary to keep the digital electronics calibrated with respect to the Sagnac phase difference being measured.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

FIG. 12A-FIG. 12D represent the occasional calibration dual staircase phase modulation $\phi_{mds}(t)$ (FIG. 12A), the total phase difference $\Delta\phi_T(t)$ (FIG. 12B) including the phase difference due to modulation and the Sagnac phase difference due to rotation, the interferogram (FIG. 12C) that maps phase difference into detected optical power, and the detected optical power $P_D(t)$ vs. time (FIG. 12D).

FIG. 13A-FIG. 13C represent the total phase difference $\Delta\phi_T(t)$ (FIG. 13A) of the occasional calibration dual staircase phase modulation approach with an error in the cancellation of the Sagnac phase difference, the interferogram showing the detected optical power vs. phase difference (FIG. 13B) and the resulting detected optical power $P_D(t)$ vs. time (FIG. 13C) showing the modulation at the bias modulation frequency due to incomplete cancellation of the Sagnac phase shift.

FIG. 14A-FIG. 14C represent the total phase difference $\Delta\phi_T(t)$ (FIG. 14A) of the occasional calibration dual staircase phase modulation approach with an error in the amplitude of the phase difference modulation, i.e. an error in the calibration loop, the interferogram showing the detected optical power vs. phase difference (FIG. 14B) and the resulting detected optical power $P_D(t)$ vs. time (FIG. 14C) showing the power modulation due to inaccurate phase modulation amplitude.

DESCRIPTION OF THE PREFERRED EMBODIMENT

The following disclosure describes several embodiments and systems for imaging an object of interest. Several features of methods and systems in accordance with example embodiments of the invention are set forth and described in the figures. It will be appreciated that methods and systems in accordance with other example embodiments of the invention can include additional procedures or features different than those shown in figures.

Example embodiments are described herein with respect to fiber optic gyroscopes. However, it will be understood that these examples are for the purpose of illustrating the principles of the invention, and that the invention is not so limited. Additionally, methods and systems in accordance with several example embodiments of the invention may not include all of the features shown in these figures. Throughout the figures, like reference numbers refer to similar or identical components or procedures.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example" or "an example embodiment," "one embodiment," "an embodiment" or various combinations of these terms means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A. Introduction.

Figure 1:
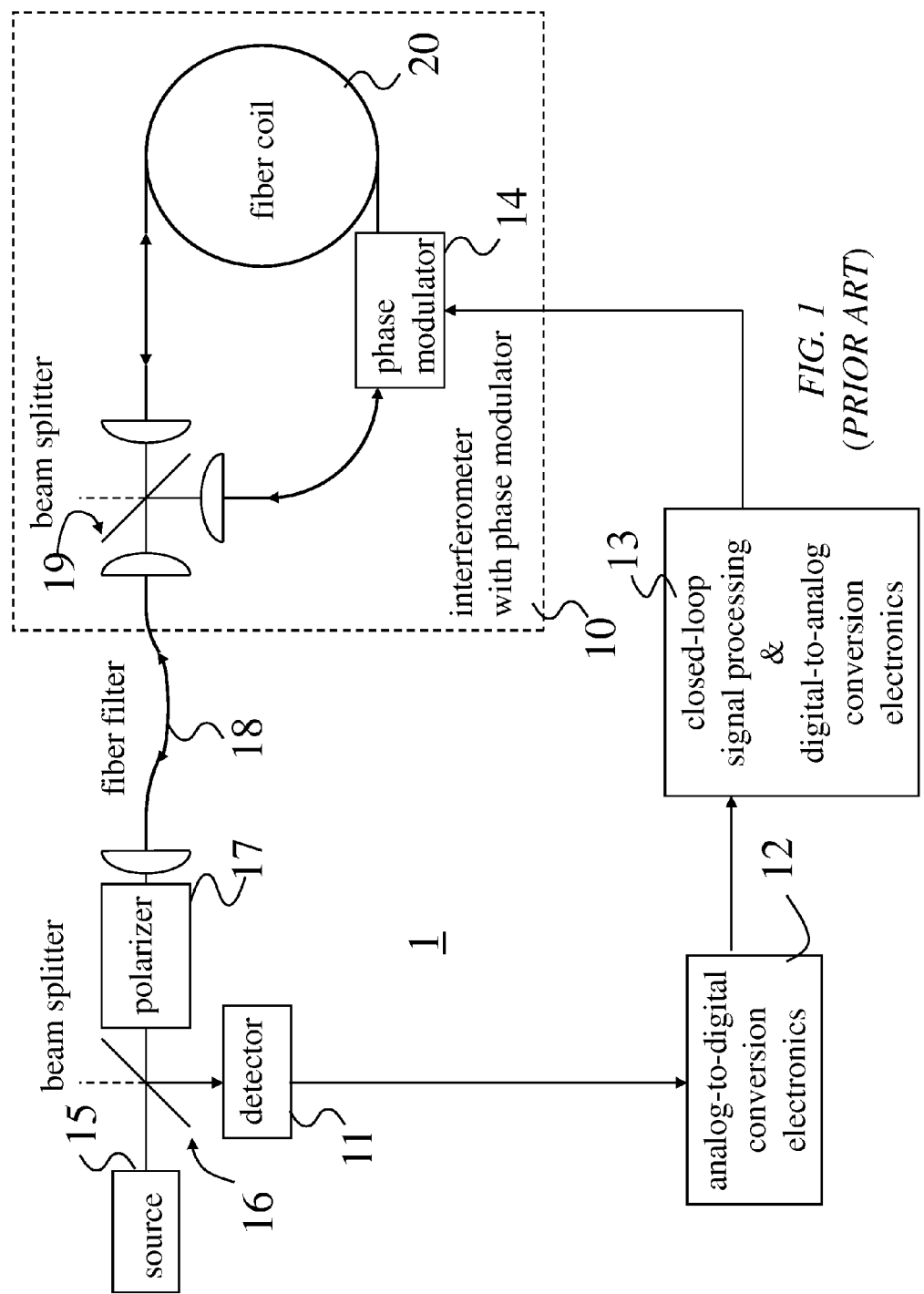
FIG. 1 is a general representation of the closed-loop fiber optic gyroscope.

A general block diagram of the fiber optic gyroscope employed in accordance with the present invention, and also of the prior art, is depicted in FIG. 1 as aforedescribed in the prior art subsection "B. Basic Fiber Gyroscope Design". The closed loop signal processing and digital-to-analog (DAC) conversion electronics 13 may take on a variety of forms as described herein. In the following exposition, phase modulation and phase difference modulation will first be discussed, followed by a discussion of the major control loops of the present invention with comparison to those of the prior art. This will be followed by a description of the block diagram of the signal processing of the present invention by way of the block diagrams illustrated in FIG. 4, and completing the description of the invention with a discussion of modulation waveforms.

B. Phase Modulation and Phase Difference Modulation

This subsection begins by reiterating how phase modulation applied to two counter-propagating waves within a Sagnac interferometer by phase modulator 14 (see FIG. 1) becomes phase difference modulation between the two waves as they exit the interferometer and interfere with each other at the detector. The seemingly complex phase modulation and phase-difference modulation is described as a sum of three or four relatively simple phase modulation components and phase-difference modulation components, respectively. Digital signal modulations present within the signal processing correspond directly to both phase modulation and to phase difference modulations. Understanding this correspondence will also make it easier to understand the signal processing as set forth herein.

Herein, the term "phase modulation" and the symbol "$\phi_m(t)$" are reserved for the modulation applied to both of the counter-propagating waves at the phase modulator 14 and the terms "phase difference," and "phase difference modulation," and the symbol "$\Delta\phi(t)$" are used in reference to the difference between the phases of the counter-propagating waves as they interfere with each other at the detector. The two counter propagating waves are derived from a single light wave. Thus any phase difference at the detector is due to the relative length of their optical paths as they propagate in opposite directions around the fiber loop. Their differences are ideally due to the rotation rate of the interferometer and phase difference modulation. The phase modulation creates phase difference modulation because the phase modulator is not at the center of the fiber loop. In fact it is typically positioned at one end of the fiber loop. A first light wave propagating in one direction passes through the phase modulator just before it leaves the interferometer and it reaches the detector almost immediately thereafter. A second light wave propagating in the opposite direction passes through the phase modulator and then through the fiber loop. Phase modulation applied equally to both waves is not equal for the two waves interfering at the detector. For the two waves arriving at the detector at the same time, difference in their phases due to modulation, $\Delta\phi_m(t)$, results from one wave receiving its modulation a negligibly short time earlier and another counter propagating wave receiving its modulation $\tau$ seconds earlier still, and related according to the formula:

$$\Delta\phi_m(t)=\phi_m(t)-\phi_m(t-\tau).$$

The value "$\tau$" as used herein is the optical wave propagation time difference between the short and long paths from phase modulator 14 to detector 11.

The Sagnac interferometer together with the off-center phase modulator 14 converts phase modulation at the phase modulator 14 into phase difference modulation at the detector 11 according to the above formula. Within the closed loop signal processing, see, for example, FIG. 4, the feedback accumulator 30 does the reverse. A digital signal modulation that corresponds to phase difference modulation at the input of the feedback accumulator 30 is converted into a digital signal modulation that corresponds to phase modulation at its output. In fact, the output digital signal modulation is converted to an analog electrical signal that drives the phase modulator. The phase modulation might then be considered an intermediate stage between digital signal modulation corresponding to phase difference modulation and actual phase difference modulation. This correspondence between the digital signal modulation at the input of the feedback accumulator 30 and the phase difference modulation will make it easier to understand the signal processing block diagram in FIG. 4

The phase modulation is designed to accomplish four major tasks simultaneously, and can be understood as the sum of four separate component modulations. First of these four is a bias modulation that enables electronics to create a demodulated error signal that is linearly related to any small additional phase differences. Second is a first feedback phase modulation that compensates for phase difference due to rotation. This compensation is imperfect in the short term, but by keeping the phase difference small to maintain the linear relationship, any error is not lost and the error can be compensated for in the long term. A third component keeps the phase modulation from exceeding dynamic range of the phase modulator 14, and a fourth component is a second feedback phase modulation that calibrates digital values within the signal processing in terms of phase modulation of the optical waves within the interferometer. Improving this fourth component of modulation is one of the purposes of this invention. These four modulation components will be discussed in more detail in the next three subsections. The latter three will be discussed beginning with the subsection on control loops.

The bias modulation is not directly controlled in a control loop. That is, a change in the bias modulation does not cause a feedback loop to correct that change. It is a facilitator for the control loops, but it is not directly part of feedback control. Bias modulation has been a part of the earliest fiber gyroscopes; long before sophisticated closed-loop designs were conceived. Sine wave bias modulations were first used, but square wave bias modulations are preferred when using a high-speed phase modulator 14. Bias modulation can be separated spectrally into frequency components, the lowest of which is known as fundamental frequency. Other frequency components are integer multiples of the fundamental frequency; preferably odd integer multiples of the fundamental frequency. If the fundamental frequency of the bias modulation is matched to the phase modulator position in the Sagnac interferometer such that its period is $2\tau$ then regardless of the shape of the bias phase modulation waveform, it transforms to a bias phase difference modulation that oscillates symmetrically about zero. Therefore when the bias phase difference modulation is added to another phase difference, then the total phase difference oscillates back and forth symmetrically about the preexisting phase difference.

Figure 2:
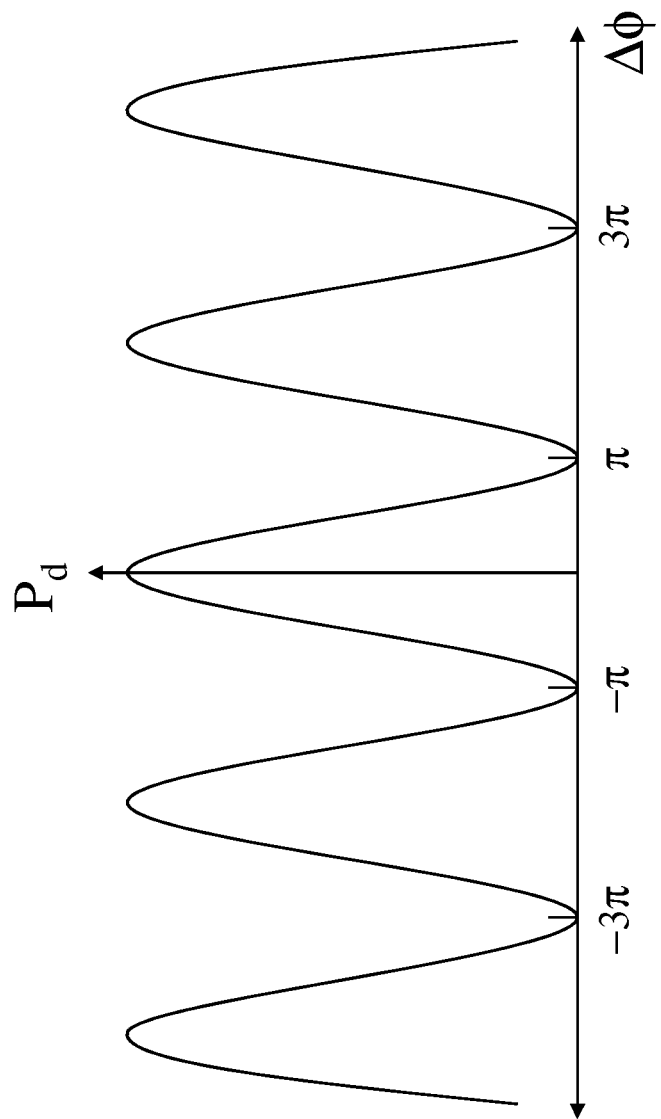
FIG. 2 is an interferogram, i.e. a plot of detected optical power versus phase difference between two interfering waves.

The bias phase modulation of the preferred embodiment of the present invention is a square wave with period $2\tau$ and peak-to-peak amplitude $\pi/2$. This becomes a square wave bias phase-difference modulation with the same $2\tau$ period, but with peak-to-peak amplitude of $\pi$. A small phase difference, $\Delta\phi_\varepsilon$, is shifted with bias phase difference modulation alternately to $$\Delta\phi_\varepsilon + \frac{\pi}{2}$$

for duration $\tau$ and to $$\Delta\phi_\varepsilon - \frac{\pi}{2}$$

for duration $\tau$. At these values of total phase difference the detected optical power is sensitive to small changes in the small phase difference $\Delta\phi_\varepsilon$. This sensitivity to small changes in phase difference will not exist without the bias modulation. Similar small phase differences near $\pi$ are shifted back and forth to values near $3\pi/2$ and $\pi/2$. Also phase differences near minus $\pi$ are shifted back and forth to values near minus $\pi/2$ and minus $3\pi/2$. The average phase difference after each cycle of the bias modulation is still the same as it would be without the bias modulation, but the phase difference spends almost all the time on one steep slope or another of the interferogram, see FIG. 2. This shifting of the phase difference is possible from any phase difference, but the control loops described in this document use integer multiples of $\pi$.

The detected optical power is the same for all odd integer multiples of $\pi/2$ radians of phase difference. Therefore, while the phase difference is shifting by large amounts, from say minus $3\pi/2$ to minus $\pi/2$ to $\pi/2$ to $3\pi/2$, the detected optical power remains constant except for spikes in optical power that occur during the transitions from one phase difference value to another, see FIG. 12.

If a small phase difference is added, then the square wave bias phase difference modulation is centered on the small additional phase difference, and this causes a square wave modulation of the optical power at the detector, see FIG. 13. The amplitude of the detected optical power modulation is approximately proportional to the small additional phase difference. More generally, detected optical power modulation amplitude is a sinusoidal function of any additional phase difference, and the sinusoidal function is approximately linear to small phase deviations about zero phase difference and small deviations about any integer multiple of $\pi$ radians. Detector output is an electrical signal that is proportional to the detected optical power. The electrical signal is demodulated to derive an error signal upon which a control loop will act.

The amplitude of the bias modulation is selected above to be $\pi/2$, but this value is not necessary. Any value between 0 and $\pi$ will work, and there are good reasons for selecting values other than $\pi/2$ to optimize one characteristic or another. The detected optical power can be reduced by adjusting the bias modulation amplitude, and this reduces some noise terms to a larger extent than it reduces the signal.

C. Control Loops

There are two major feedback control loops in each of the designs mentioned in this document. The designs include: the staircase-and-fall-back design of the prior art; the prior art dual-staircase design of the '139 patent; and, described here for the first time, the occasional calibration design of the present invention. All three designs use a rotation-rate control loop and a calibration control loop. Referring now particularly to FIG. 1, the two feedback control loops have common signal paths, both optical and electrical, from output of closed-loop signal processing 13 through phase modulator 14 of interferometer 10; through the optics to the detector 11; and through the analog-to-digital conversion electronics 12; and back to the input of closed-loop signal processing, 13. The paths of both loops are completed by taking different paths through part of the closed loop signal processing and digital-to-analog conversion electronics 13. The paths through the signal processing electronics 13 will be discussed in the following section.

The rotation-rate feedback loop introduces a rotation-rate feedback phase-difference modulation (RRFPDM), $\Delta\phi_{mR}(t)$ or 802 in FIGS. 6B, 6C, 9B, 9C, 10B, and 11B that is intended to be equal-and-opposite to the phase difference due to rotation, i.e. the Sagnac phase difference, $\Delta\phi_R(t)$. The rotation rate loop attempts to null the sum of these two phase-differences. If the rotation rate changes in time, then the Sagnac phase difference, $\Delta\phi_R(t)$, changes, and an error signal becomes non-zero. The RRFPDM $\Delta\phi_{mR}(t)$ 802 is adjusted in order to zero the error signal, and thereby become once again equal to the Sagnac phase difference, $\Delta\phi_R(t)$. The RRFPDM $\Delta\phi_{mR}(t)$ 802 is thereby proportional to the rotation rate, and the digital value used to create it is also proportional to the rotation rate. The nulling process is less than perfect in the short term. It is influenced by noise from a variety of sources; a finite closed loop bandwidth combined with a rate of change of rotation rate; and limited digital resolution of DAC 31 (see FIG. 4.). Deviations from null are not lost, and in time the averaged value of the sum of the two phase difference components is very accurately zeroed. A digital signal within the signal processing electronics is responsible for creating the RRFPDM and this signal is called rotation-rate feedback phase-difference modulation digital signal (RRFPDMDS). The RRFPDMDS is proportional to the RRFPDM, and therefore proportional to the rotation rate of the FOG, with the exception that it includes short-term fluctuations due to imperfections mentioned above. In time an averaged RRFPDMDS has an increasingly accurate proportional relationship to the rotation rate of the FOG. The creation of the RRFPDMDS is an important first step in creating a closed-loop FOG.

Creation of a calibration control loop is a second important step in creating a closed-loop FOG. The calibration control loop either measures or imposes a relationship between a digital value in the signal processor and a corresponding phase difference between the two waves exiting the interferometer. This relationship can be described as a transfer function. This transfer function in a well-designed FOG is largely independent of frequency and thus can be assumed to be a constant of proportionality. The value of the proportionality constant is dependent upon a variety of parameters, not the least of which is temperature. As a result, the constant must be measured frequently so that the appropriate value is used to properly scale the RRFPDMDS. To accomplish this measurement a calibration feedback phase-difference modulation digital signal (CFPDMDS) is created and it in turn creates a calibration feedback phase-difference modulation (CFPDM) (see 807 in FIGS. 9B and 9C, 809 in FIG. 10B, and 811 in FIG. 11B) that is adjusted according to the interferogram (see FIG. 2) to have a predetermined phase-difference modulation amplitude. In a preferred embodiment of this invention a digital signal is created that represents a phase difference of $2\pi$ radians and this digital signal can be referred to as a $2\pi$ digital signal ($2\pi$DS). If the measurement technique is used, then each time this transfer function is measured, the $2\pi$DS is updated. Both the RRFPDMDS and the $2\pi$DS depend in the same way upon the transfer function and by dividing the RRFPDMDS by the $2\pi$DS (see divider 40 in FIG. 4) the transfer function is eliminated from the rotation-rate measurement. Another technique stabilizes the transfer function. Both techniques perform a real time calibration of the signal processing with respect to the phase differences affecting the interferogram. As a result of updating the $2\pi$DS in real time using the calibration control loop an accurate measure of rotation rate can be made even in a time varying environment.

The calibration control loop is implemented differently between the present invention and the two prior art approaches: the staircase-and-fall-back approach and the prior art dual-staircase approach of the '139 patent. These two prior art approaches had to be modified to be able to be combined to make the occasional calibration approach. In the preferred embodiment of the occasional calibration approach the transfer function between digital values and the actual phase modulation is measured to create the $2\pi$DS and then the RRFPDMDS is divided by the $2\pi$DS to remove any variations in the transfer function. In the prior art embodiment of the staircase and fallback approach the transfer function is stabilized so that a fixed value within the digital signal processing always represents a fixed phase difference. Both the measurement-and-normalization approach and the transfer-function-stabilization approach are valid techniques to effect calibration. The prior art staircase-and-fall-back was modified to create a new staircase-and-fall-back approach that used the measurement-and-normalization technique in order to make it work with the dual-staircase approach. The prior art dual-staircase approach of the '139 patent had a calibration modulation that switched back and forth between plus $\pi$ and minus $\pi$ (see 803 in FIG. 6B). This calibration phase-difference modulation had to be changed to switch between plus $2\pi$, minus $2\pi$ and zero (see 807 in FIGS. 9B and 9C). This was necessary in order to set the calibration phase-difference modulation to zero for periods of time. This is a fundamental part of the occasional calibration technique. The calibration component of the phase modulation in its simplest form switches between two values: a first substantially constant value and a second substantially constant value that is controlled to be on average $2\pi$ greater than the first value (see 707 in FIG. 9A). Another embodiment also includes a third substantially constant value that is controlled to be on average $2\pi$ less than the first value (see 711 in FIG. 11A). The new calibration modulation can still result in a dual-staircase modulation waveform when combined correctly with the bias modulation as shall be seen in the section on waveforms below.

Figure 4:
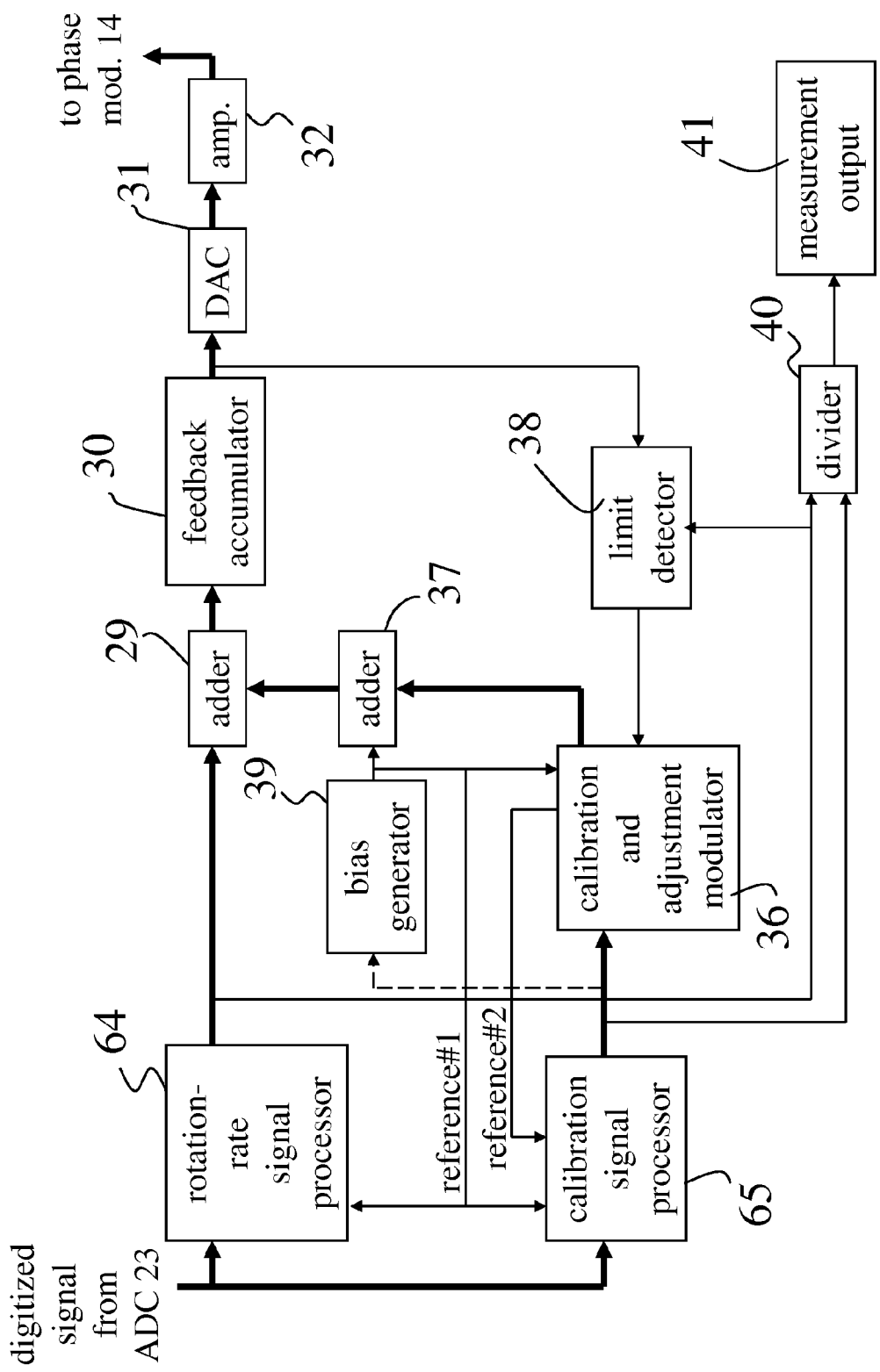
FIG. 4 shows a block diagram of an example of occasional dual-staircase signal processing electronics. The paths of the digital portion of the two major control loops used in a FOG are highlighted with dark lines. Both control loops involve optics as well as electronics. One control loop provides a phase difference between the waves exiting the interferometer that is equal and opposite rotation-rate induced phase difference, and another provides a phase difference that is used to calibrate the digital electronics.

A block diagram of the electronics for the occasional calibration is shown in FIG. 4. In the measurement-and-normalization technique of calibration a specified phase difference value, e.g. $2\pi$, is measured digitally in real time. Then the digital value corresponding to the phase difference needed to null the rotation-rate phase difference is noted and the latter is normalized by dividing by the former in order to determine the actual phase difference. The denominator changes a small amount with the environment. This is primarily because the transfer function of the phase modulator changes with the environment. Thus the normalization must be done in real time to remove environmental effects. Environmental changes occur slowly and the calibration feedback loop does not need to be fast to keep up. For example, it is sufficient to make the calibration measurement at a rate of 10 kHz or less. The prior art dual-staircase technique makes calibration measurements at a rate on the order of 100 kHz depending on the length of fiber in the fiber coil.

The present invention significantly improves the calibration feedback control loop over what is available in the prior art. The calibration control loop of the present invention provides a feedback signal that is relatively independent of rotation-rate because it makes measurements at times that are substantially different from the waveform adjustment transitions. The calibration feedback of the staircase and fallback technique relies upon the fallback portion of the waveform to obtain the information to close the loop. The frequency of the fallbacks is proportional to the rate of rotation. Thus the error signal for loop closure and likewise the gain of the feedback loop are proportional to the rotation rate. This type of feedback loop is less than ideal.

The calibration feedback of the dual-staircase technique is largely independent of rotation rate, and this is good, but it has the problem that it contributes to an unacceptable bias error to the rotation rate measurement in some fiber optic gyroscopes (FOGs). The calibration modulation of the present invention significantly reduces this error. The calibration modulation of the present invention contributes a negligible bias measurement error.

According to the present disclosure the two prior art calibration control loop approaches are combined to create an occasional calibration approach. This occasional calibration approach gives reliable rate-independent calibration feedback without significant adverse bias error. A greater insight into how this occasional calibration approach works will become apparent as a result of the discussions in the sections below.

D. Signal Processing and Digital-To-Analog Conversion Electronics Block Diagrams Referring now to FIG. 4, the signal processing for the occasional calibration waveform dual-staircase approach of the present invention is described in this subsection with the help of this block diagram. FIG. 4 shows the paths of control signals of the two major control loops, i.e. the rotation rate loop and the calibration loop by way of heavy dark lines. They are common through part of the electronics; specifically from adder 29; through feedback accumulator 30; through digital-to-analog converter (DAC) 31; and amplifier 32 and on to the phase modulator 14. The paths of the control loops differ in the beginning of the signal processing electronics. The path of the signal of the rotation rate loop passes through a rotation-rate signal processor 64 and then on through adder 29; whereas the path of the signal of the calibration loop passes through a calibration signal processor 65; through a calibration modulator 36, an adder 37, before adding to the signal of the rotation-rate loop in adder 29.

In FIG. 4, the output from ADC 23 is provided as an input to rotation rate signal processor 64 and calibration signal processor 65. The output signal of rotation rate signal processor 64 is provided as a first input to signal adder 29, a first input of signal divider 40, and a first input to limit detector 38. The output signal of calibration signal processor 65 is a first input of signal calibration modulator 36 and its output is provided as a second input to signal adder 29 by way of signal adder 37. The output signal of calibration signal processor 65 is also the second input of signal divider 40. The output of signal divider 40 is provided as the input to measurement output signal electronics 41. The output of signal adder 29 is provided as the input to feedback accumulator 30. In turn, the output of signal accumulator 30 is provided as the input to phase modulator 14 sequentially through digital-to-analog converter 31 and amplifier 32. The output of accumulator 30 is proportional to the phase modulation applied to the phase modulator 14 and it will be labeled as the phase modulation digital signal (PMDS). As a second input to limit detector 38 is the output of feedback accumulator 30.

A few digital signals identified above will now be associated with the signal processing block diagram just described. The RRFPDMDS is produced at the output of the rotation-rate signal processor 64. The RRFPDMDS as discussed above is proportional to the rotation rate. The calibration signal processor 65 produces at its output a digital value corresponding to an optical phase difference of $2\pi$ radians, herein identified as the "$2\pi$ digital signal" ($2\pi$DS). The calibration modulator 36 produces at its output digital values corresponding to phase differences of $2\pi$, minus $2\pi$, and zero (807, 809, and 811). The $2\pi$ and $-2\pi$ values are held for a duration of $\tau$, and the zero value is held for one or more $\tau$. This signal was described above as CFPDMDS (807, 809, and 811) and will be discussed below in more detail. Further, the output of the limit detector 38, having as inputs (i) the RRFPDMDS, and (ii) the PMDS (701, 708, and 710) output of the feedback accumulator 30, is a single bit received by the calibration modulator 36. The output of the bias generator 39 is added to the CFPDMDSs in adder 37, and its output is added to the rotation-rate digital value in adder 29.

Also shown in FIG. 4 are bias generator 39 and divider 40. The $2\pi$DS may be used as an input signal to the bias generator 39, but it is not necessary for accurate rotation-rate measurements. Divider 40, having as inputs (i) the RRFPDMDS, and (ii) the $2\pi$DS, provides an output signal indicative of the measurement of rotation rate that is received by the measurement output 41 and it is made available for external use.

Figure 3:
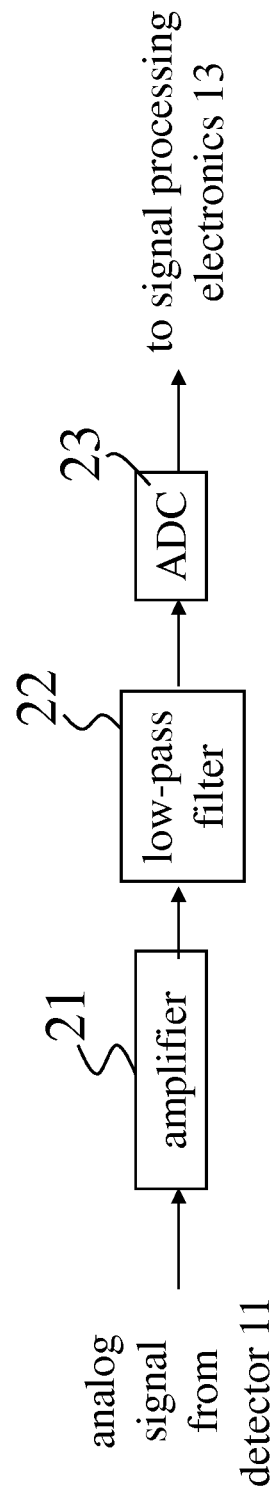
FIG. 3 is a block diagram representing of analog-to-digital conversion electronics.
Figure 5:
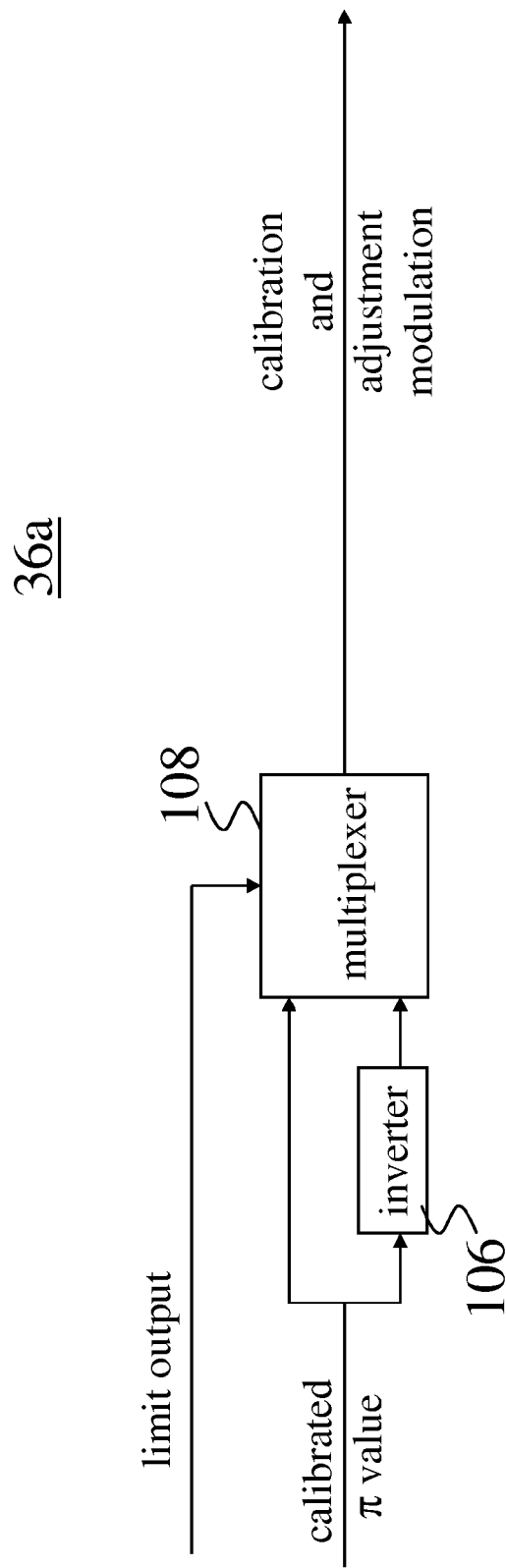
FIG. 5 shows a prior art version of a calibration modulator wherein the calibration value π is alternately inverted to form a waveform that alternately takes on the value of plus π and minus π.

While connections between blocks of FIG. 4 have been described, and a few signals have been introduced, description of FIG. 4 is continued here with a brief explanation of the block functions. The signal enters the block diagram from the analog-to-digital conversion electronics 12 in FIG. 1, or more particularly from ADC 23 in a detailed block diagram of those electronics in FIG. 3. It is simultaneously processed in both the rotation-rate signal processor 64 and the calibration signal processor 65. The output of the rotation-rate signal processor 64 is the RRFPDMDS. The RRFPDMDS is proportional to the Sagnac phase difference. The output of the calibration signal processor 65 in the dual staircase implementation is the $2\pi$DS. The $2\pi$DS corresponds to a phase difference between two light waves of $2\pi$ radians. If a step of this magnitude were passed through the analog-to-digital converter (ADC) 31 and amplifier 32 and delivered to the phase modulator 14, then this would create a step in phase of $2\pi$ radians for each of the two waves propagating in opposite directions through the phase modulator 14. The present disclosure provides an improved calibration modulator that has a different output in the present invention than it had in the prior art. In the prior art dual-staircase technique of the '139 patent the calibration modulator 36 served to change the sign of a $\pi$ digital signal in order to derive a signal that switches from plus to minus the $\pi$ digital signal. See FIG. 6B signal 803. This modulated it digital signal became the phase-difference modulation, i.e. plus and minus $\pi$ radians, of the calibration control loop. A simple prior art calibration modulator 36 is shown in FIG. 5.

Figure 8:
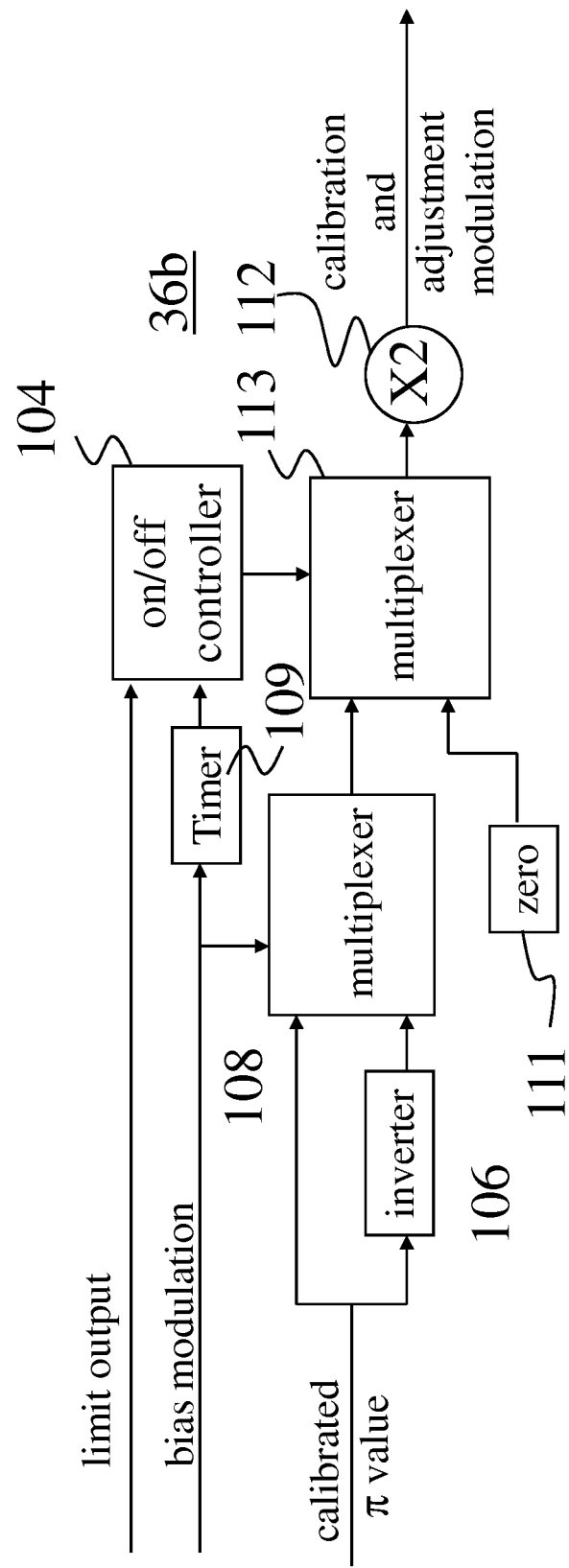
FIG. 8 shows a detailed version of a calibration modulator as employed in an example embodiment of an occasional calibration phase-difference modulation process for a Sagnac interferometer. It creates a digital waveform that takes on the values of $+2\pi$, $-2\pi$, and zero.

In an advance over the prior art, the current invention provides an occasional calibration modulator 36 As shown in FIG. 8 that has the ability to output the three values corresponding to phase differences of $2\pi$, $-2\pi$ and zero. See signal 807 in FIGS. 9B and 9C and signal 809 in FIG. 10B and signal 811 in FIG. 11B. The values corresponding to $2\pi$ and $-2\pi$ are each held for one $\tau$ before switching to another value. The value of zero is held for one $\tau$ or many $\tau$. These values are arranged following a set of rules for best results. First, the calibration modulation is synchronized with the bias modulation. The $2\pi$ of the calibration modulation occurs at the same time as the minus $\pi/2$ of the bias modulation. The minus $2\pi$ of the calibration modulation occurs at the same time as the plus $\pi/2$ of the bias modulation. A first sequence occurs in one or multiple time periods of $2\tau$ where the calibration modulation will assume the value of zero for duration $\tau$ followed by a value of $2\pi$ for a duration of $\tau$. A second sequence occurs in one or multiple time periods of $2\tau$ where the calibration modulation will assume the value of minus $2\pi$ for duration $\tau$ followed by a value of zero for a duration of $\tau$. A third sequence occurs in one or multiple time periods of $\tau$ where the calibration modulation will assume the value of zero for duration $\tau$. A typical calibration modulation total sequence might consist of a single first sequence followed by a single second sequence followed by one hundred third sequences. This total sequence would repeat with an occasional first sequence or second sequence thrown in to adjust the phase modulation to keep the phase modulation within the dynamic range of the phase modulator. Further elaboration on this calibration modulation will be given below in the section on waveforms. The total sequence just described is shown in waveform 809 in FIG. 10B. An alternative way of describing a typical calibration phase-difference modulation sequence as shown in signal 809 of FIG. 10B is as a plus $2\pi$ for a duration $\tau$, a minus $2\pi$ on the subsequent duration $\tau$, and afterward zero for a number of $\tau$. Often a solitary $2\pi$ or minus $2\pi$ must be included to keep the phase modulation within the dynamic range of the phase modulator.

The sum of CFPDMDS (e.g. 809) and waveform adjust component (e.g. 806) are created in block 36 and are added to RRFPDMDS in adder 29 where the two control loops are brought back together. Since, the output of bias generator 39, i.e., bias phase difference waveform generator, is also added into the signal in adder 37, the input to the feedback accumulator 30 is the effective sum of four digital signals (e.g. 802, 805, 806, and 809).

Feedback accumulator 30 performs an accumulation, i.e. it adds its input to its output to derive a new output, once per time period $\tau$. The time between accumulations is chosen to match the difference in propagation time $\tau$ from phase modulator 14 to detector 11 for the two counter-propagating light waves. If the times are well matched, then transforming from phase modulation 708 to phase-difference modulation 808 will compensate for the transformation through the feedback accumulator 30. Accordingly, the input to the feedback accumulator corresponds to the phase-difference modulation 808.

The output of the feedback accumulator is proportional to the phase modulation 708. This phase modulation can be described in terms of steps. A combination of a transition and an immediately following constant value is referred to as a phase-modulation step; and a phase-modulation up-step is any transition and constant value wherein said transition is from a lesser constant value to a greater constant value, and a phase-modulation down-step comprises a transition and constant value wherein said transition is from a greater value to a lesser value. The phase modulation is a combination of sequences including a first sequence comprising a plurality of up-steps one after another; and a second sequence comprising a plurality of down-steps one after another; and a third sequence of alternating between up-steps and down-steps (see 708 in FIG. 10A).

An important innovation of the present invention results from the way the dual-staircase modulation is formed. The $2\pi$ portion of the CFPDMDS (and phase difference) is added to the minus $\pi/2$ portion of the bias modulation digital value (and phase difference) to create a plus $3\pi/2$ portion of the digital value input to the feedback accumulator 30 (and the phase difference on the interferogram FIG. 2). The feedback accumulator 30 creates the large up step of the dual staircase modulation from this portion of its input. The minus $2\pi$ portion of the CFPDMDS (and phase difference) is added to the plus $\pi/2$ portion of the bias modulation digital value (and phase difference) to create a minus $3\pi/2$ portion of the digital value input to the feedback accumulator 30 (and the phase difference on the interferogram FIG. 2. The feedback accumulator 30 creates the large down step of the dual staircase modulation from this portion of its input. The rotation-rate digital value is also added into the input of feedback accumulator 30 to compensate for the Sagnac phase difference. The zero portion of the CFPDMDS is added to the bias modulation to create the plus and minus $\pi/2$ portion of the phase difference and the digital value input to feedback accumulator 30. These bias portions plus zero calibration modulation outputs plus the rotation rate compensations component make up the small steps of the dual staircase modulation.

Creating the dual-staircase modulation in this way, the calibration modulation can be turned on (containing sequences of zero and $2\pi$ and sequences of minus $2\pi$ and zero) and off (set to zero) without upsetting either the rotation-rate feedback loop or the calibration feedback loop. Of course the calibration feedback loop will not be updated during the sequences while the calibration modulation is set to zero, but this feedback loop is not required to be fast. It is very slow compared to the rotation rate feedback loop. As a result, it does not need to be updated as often as the rotation rate feedback loop. Turning the calibration feedback loop off for extended periods of time reduces errors that are created by it in some FOGs.

Referring again to FIG. 4, there shown is a block diagram including the rotation-rate signal processor 64 and calibration signal processor 65, along with the rest of the closed loop signal processing and digital-to-analog conversion electronics 13. The rotation-rate signal processor 64 and the calibration signal processor 65 are similar with differing functions, of course. They both perform demodulation with demodulators to obtain an error signal, digital filtering to remove unwanted high frequency signals from the error signals, and accumulation to complete the control loop and obtain a desired digital value corresponding to a particular phase difference. Demodulation distinguishes the rotation-rate error signal from the calibration error signal. Each of the aforesaid demodulators samples the output from the ADC 23 and is multiplied by a reference signal. The rotation rate reference signal changes back and forth from a value of plus one to minus one. In the rotation-rate signal processor 64, the demodulation reference is preferably a square wave at the same frequency as, and synchronous to, the bias modulation. The calibration demodulator reference signal is slightly more complex. The rotation rate reference signal is multiplied by another waveform that takes the value of zero or plus or minus one. In the preferred embodiment of the present invention the multiplying waveform will be zero except when a dual-staircase portion to the waveform is present. At that time the multiplying waveform will take on the value of plus (or minus) one for the up-steps and minus (or plus) one for the down-steps. The actual sign of the multiplication does not matter, because eventually a multiplication of plus or minus one will be made to the calibration feedback waveform in order to effect negative feedback to close the loop. What does matter is that the sign of the multiplying waveform is different for the up-steps compared to the down-steps. As part of this disclosure it is taught that for improved performance that equal number of up-steps and down-steps should be sampled for the portion of the signal used by the calibration control loop. Also an even number of up steps should be used, and likewise an even number of down steps should be used. Also the smallest even number of up steps is equal to two, and the number of down steps is each equal to two.

The signal is filtered after demodulation, and to explain the filter operation it is helpful to look more closely at the signals entering the demodulators. The signal from detector 11 (FIG. 1) is proportional to the detected optical power. It is amplified, filtered, and sampled by the ADC 23 during the flat portion of each phase step. One can assign the one signal level to any given phase difference. The phase difference values are the same for the prior art dual-staircase modulation approach and the current invention occasional calibration approach. Indeed the occasional calibration approach makes use of dual-staircase modulation on occasion. The occasional calibration waveform dual-staircase scheme strives to use four values of phase difference. These correspond to two values of bias phase-difference modulation, e.g. $\pm\phi_{mbm}$ and the extra calibration modulation component steps of $2\pi-\phi_{mbm}$ in place of $-\phi_{mbm}$ and $\phi_{mbm}-2\pi$ in place of $+\phi_{mbm}$. If $\phi_{mbm}\cong\pi/2$ one can identify the four values as $\Delta\phi_1\cong\pi/2$, $\Delta\phi_2\cong3\pi/2$, $\Delta\phi_3\cong-3\pi/2$, and $\Delta\phi_4\cong-\pi/2$. During any given $\tau$ the relationship between achieved phase difference and desired phase difference is not exact. This results in a nonzero error signal. The error signal from one phase difference step is compensated for by error signals of future phase difference steps so that over time average of the actual phase difference values becomes increasingly close to the desired value of phase difference. To accomplish this averaging a signal related to the detected optical power during any given phase difference step is recorded. For phase difference $\Delta\phi_1$ signal x1 is obtained and likewise for $\Delta\phi_2$, $\Delta\phi_3$, and $\Delta\phi_4$ signals x2, x3, and x4, are obtained, respectively. There is at least one new $\Delta\phi_1$, for every dual-staircase cycle, and each one is slightly different. For simplicity one may use a single constant phase difference to identify them. Likewise the many corresponding signal values are all identified as x1. This is likewise true for $\Delta\phi_2$, $\Delta\phi_3$, $\Delta\phi_4$ and x2, x3, and x4.

Error signals are derived from these signals for each control loop. To obtain a complete and accurate measurement of phase difference, it is possible to use even numbers of phase difference values corresponding to integer numbers of periods of the bias modulation. As an example an error formed by x1−x2 can be used to record deviations from the phase difference $\pi$ radians. The average deviation from $\pi$ radians can be reduced by accumulating many pairs of x1−x2 error signal in an accumulator and adjusting the values of $\Delta\phi_1$ and $\Delta\phi_2$. This is what was done in the prior art dual-staircase approach and in the occasional calibration approach. Two main reasons why this phase difference error signal is nonzero are an incorrect RRFPDMDS for the current rotation rate or an incorrect $2\pi DS$. If the RRFPDMDS is incorrect and $2\pi DS$ is correct then the error signal formed by x3−x4, used to record deviations from minus $\pi$ radians will have the same error. If the RRFPDMDS is correct and $2\pi DS$ is incorrect then the error signal formed by x3−x4 will have the opposite error, i.e. the same magnitude error but with opposite sign. Using the appropriate filter one can distinguish that the two control loops are separated. In the occasional calibration dual staircase phase modulation approach disclosed herein, the additional error signal formed by x1−x4 is used to update the RRFPDMDS.

In the calibration control loop of the current invention as well as in the prior art dual staircase approach the output of the calibration modulation filter 34 is x1−x2 minus x3−x4. The average of this filtered calibration error signal is zeroed by the calibration control loop by adjusting the amplitude of the $2\pi$DS. The output of the dual-staircase-modulation filter 34 is a filtered calibration error signal. The calibration error signal becomes the input of the calibration accumulator 35 whose output is the $2\pi$DS.

The rotation-rate loop can also use the error signal formed by x1−x2. If the calibration modulation amplitude is correctly adjusted then the error formed by x1−x2 would be due to an error in compensation of the Sagnac phase difference. In addition x3−x4 would provide the same amount of error if the error were truly due to imperfect compensation of the Sagnac phase difference, as would the error formed by x1−x4. All three of these pairs are output from a the modulation filter 25 to be accumulated by the rotation-rate accumulator 28. Every $2\tau$ a new error signal is output by the modulation filter 25 and presented to the input of the rotation-rate accumulator 28. The output of the rotation-rate accumulator 28 is the RRFPDMDS. If the RRFPDMDS is correct and the $2\pi$DS is incorrect, any finite error signal x1−x2 input to the rotation-rate accumulator will be compensated for by an opposite error signal x3−x4.

Referring now to FIG. 5 and FIG. 8, two detailed versions of calibration modulator, 36 are shown. FIG. 5 shows a version consistent with U.S. Pat. No. 7,505,139, and FIG. 8 shows a calibration modulator advantageously employed in the occasional calibration phase-difference modulation approach disclosed herein.

Referring specifically to FIG. 5 is a simple inverting modulator 36a that includes an inverter 106 coupled to a multiplexer 108. The inverter 106 and multiplexer 108 each receive a calibrated $\pi$ value. The multiplexer 108 is also coupled to receive the limit output and the inverter output signal. The circuit operates in response to an input calibrated value corresponding to a phase difference of $\pi$, by outputting a calibration and step down modulation signal with the same magnitude but with a positive or negative sign. The calibration and step down phase-difference modulation output is consistent with the waveform 803 shown in FIG. 6B which becomes phase modulation waveform 703 in FIG. 6A.

In contrast, the circuit shown in FIG. 8 a calibration modulator 36(b) includes an inverter 106 coupled to a first multiplexer 108 and further includes a timer 109, an on/off controller 104, a zero signal 111, and a second multiplexer 113. The inverter 106 and first multiplexer 108 each receive a calibrated $\pi$ value. The first multiplexer 108 is also coupled to receive a bias modulation signal, as is the timer 109. The on/off controller 104 is coupled to receive the limit output and the timer output signal. The on/off controller 104 generates a control signal to activate the second multiplexer 110, which, in turn receives inputs from the zero signal 111 and the first multiplexer 108. The second multiplexer output is doubled in 112 and this becomes the CFPDMDS.

In overall operation the calibration modulator 36(b) inputs a calibrated value corresponding to a phase differences of $\pi$, and outputs values that represent phase differences of $2\pi$, $-2\pi$, or zero. This output is consistent with the waveform 807 shown in FIGS. 9B and 9C, waveform 809 shown in FIG. 10B, and waveform 811 shown in FIG. 11B.

E. Modulation Waveforms

Exemplary waveforms are now presented to aid in further understating of the present invention. The feedback modulation of the phase of the counter-propagating lightwaves as imparted at the phase modulator 14 is depicted waveforms in FIGS. 6A, 7, 9A, 9B, 10A, and 11A. This is an intermediate step to creating the resultant waveforms of the modulation of the difference between the phases of the two waves as they interfere with each other at the detector. In FIGS. 6C, 9C, 10B, and 11B, emphasis will be placed on describing this phase-difference modulation as well as the resultant detected optical power in FIGS. 12-14.

Figure 6A:
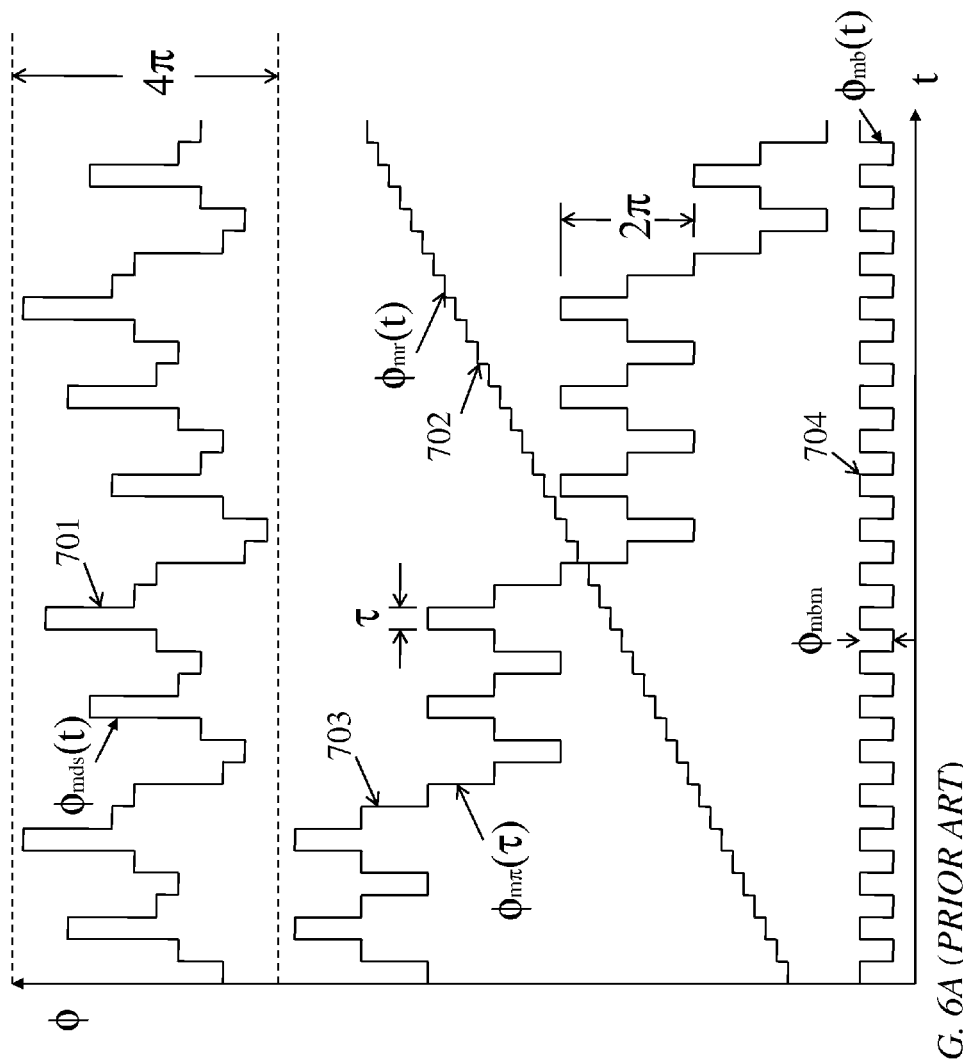
FIG. 6A represents the dual staircase phase modulation $\phi_{mds}(t)$ 701 and three component waveforms 702, 703 and 704 that are added together to form 701 including: the bias phase modulation component waveform $\phi_{mb}(t)$ 704, the rotation compensating phase modulation component waveform $\phi_{mr}(t)$ 702, and calibration and adjustment phase modulation component waveform $\phi_{m\pi}(t)$ 703 all of the related art.
Figure 6B:
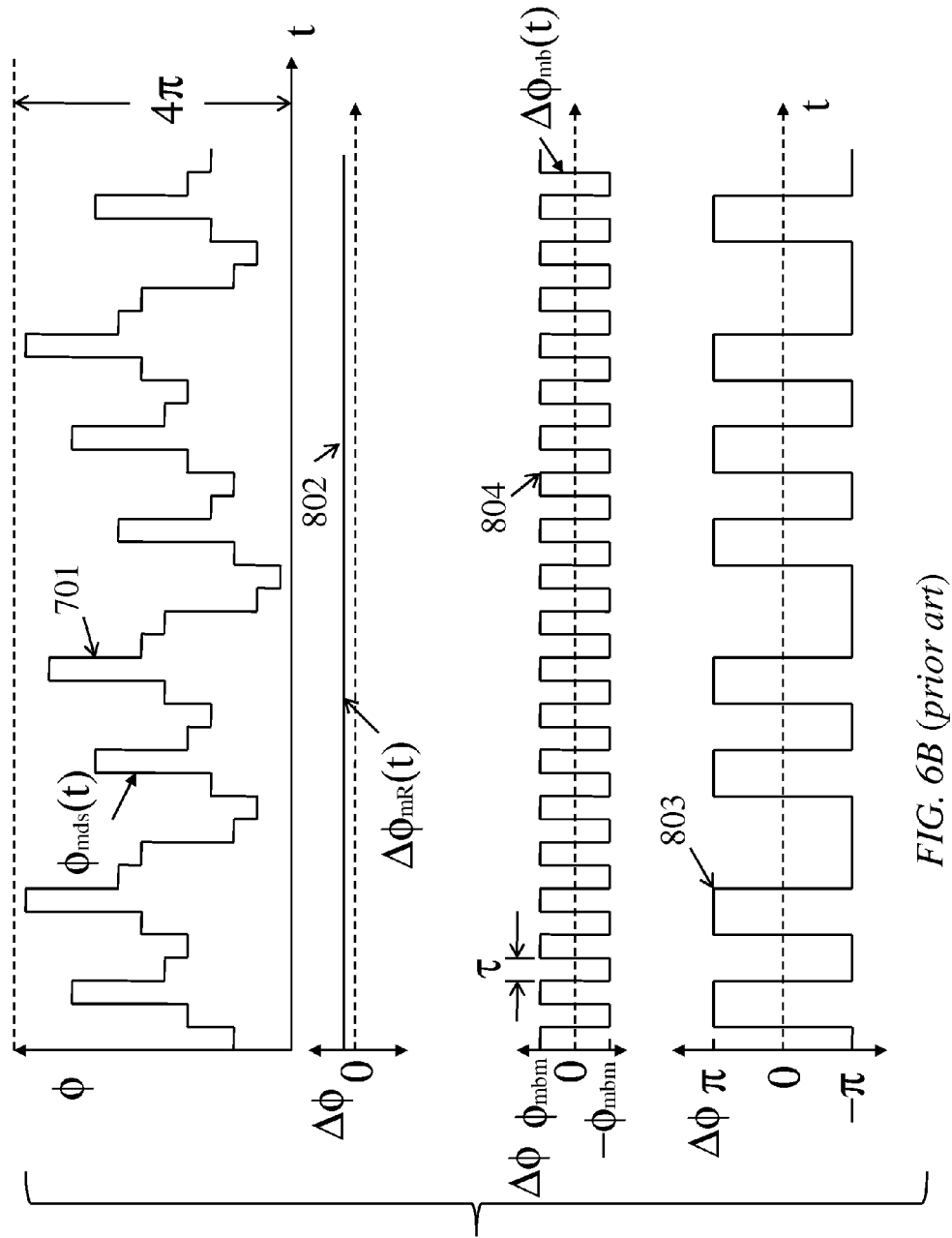
FIG. 6B shows the same dual-staircase waveform 701 as is shown in FIG. 6A, and it also shows the component waveforms that are added together to create the phase difference as is shown in FIG. 6C.
Figure 6C:
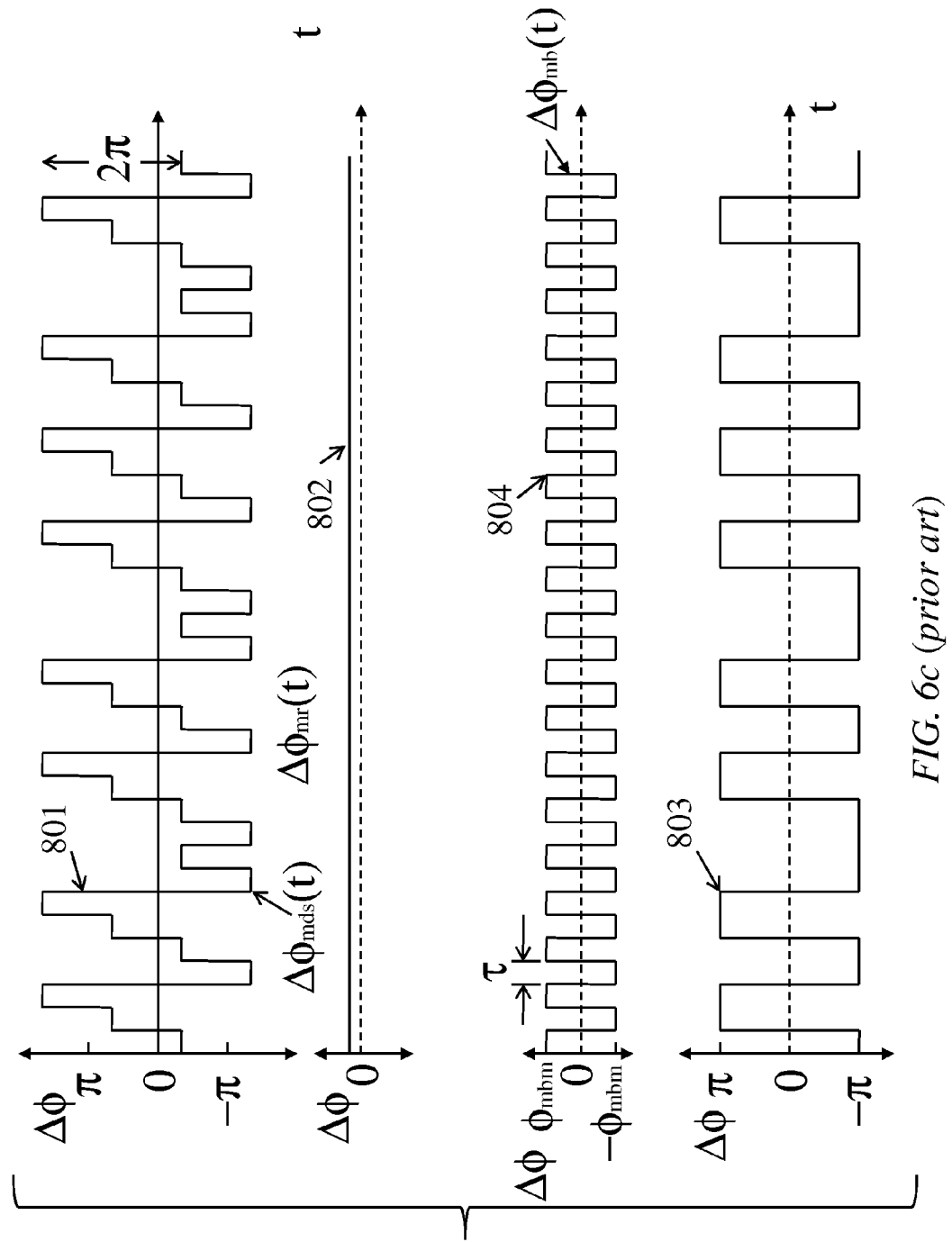
FIG. 6C shows the total dual-staircase phase-difference modulation $\Delta\phi_{mds}(t)$ (801) and the shows this waveform separated into the same fundamental component waveforms that are shown in FIG. 6B. The sum of component waveforms shown in the lower part of FIG. 6C equals the waveform at the top of the figure. The rotation rate compensation phase-difference modulation $\Delta\phi_{mr}(t)$ (802) plus the combination calibration and adjustment phase difference modulation $\Delta\phi_{ma}(t)$ (803) plus bias phase-difference modulation $\Delta\phi_{mb}(t)$ (804) equals the dual staircase phase-difference modulation (801).
Figure 7:
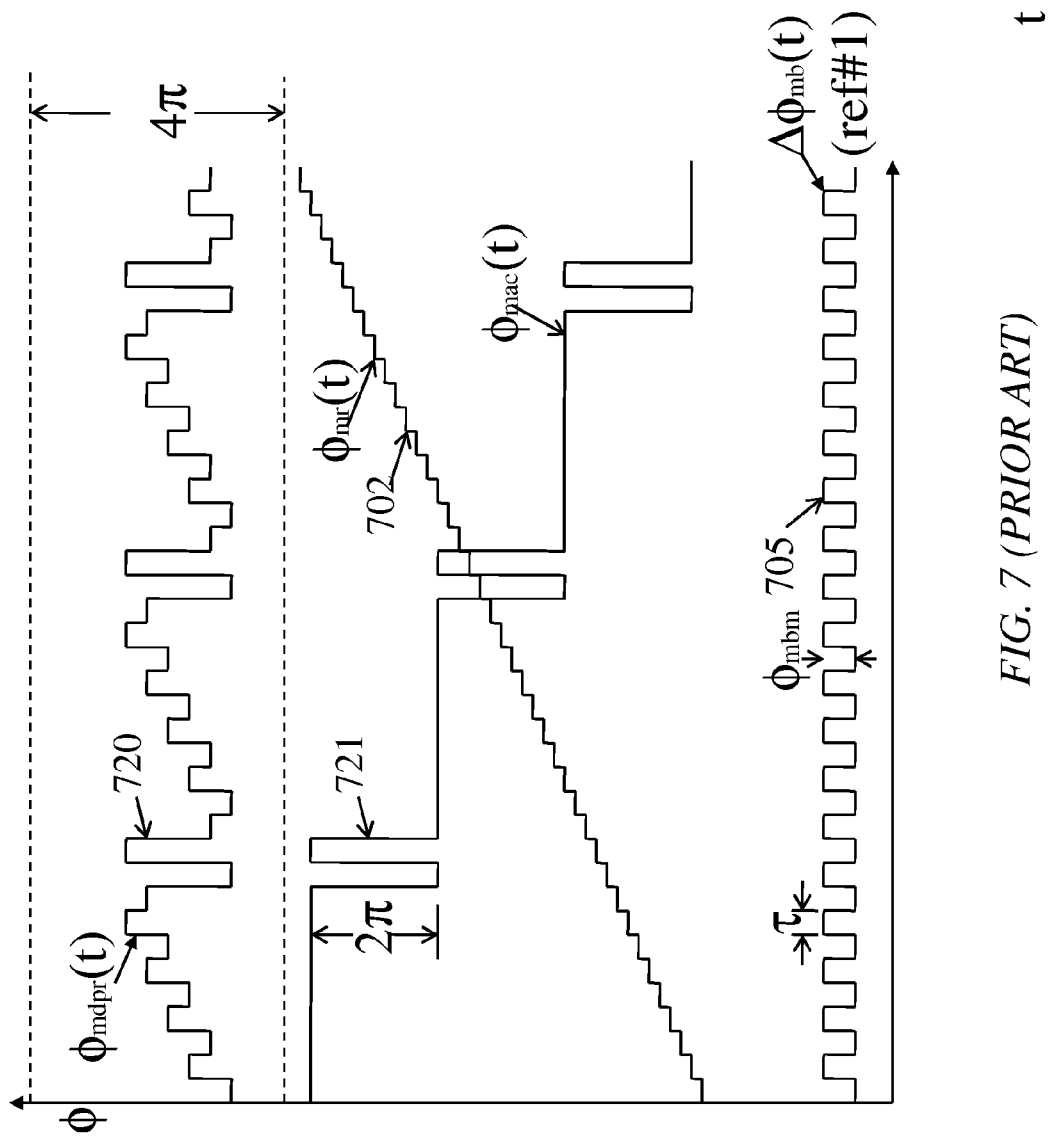
FIG. 7 represents the digital phase ramp feedback modulation $\phi_{mdpr}(t)$ 720 of the prior art, and three component waveforms 721, 702 and 705 that are added together to form 720 including: the bias phase modulation component waveform $\phi_{mb}(t)$ 705, the rotation compensating phase modulation component waveform $\phi_{mr}(t)$ 702, and calibration and adjustment phase modulation component waveform $\phi_{mac}(t)$ 721 all of the related art. Calibration information is gathered during the adjustment of the waveform to keep the total phase modulation within a given range. Note that the calibration and waveform adjustment functions occur together in a single waveform. Thus the timing of the collection of the information is a function of the rate of rotation. Indeed the calibration occurs in conjunction with an adjustment of the waveform.

The prior art dual-staircase waveforms are shown in FIGS. 6A, 6B, and 6C and discussed in detail in U.S. Pat. No. 7,505,139. The phase modulation is shown in FIG. 6A-6C for a particular rotation rate and therefore a particular rotation-rate induced phase shift. This rotation rate, and corresponding phase shift of about minus $\pi/6$, is selected for illustrative purposes, but it is not an atypical rate rotation rate. The bias phase-difference modulation waveform is shown in FIG. 6B signal 804. The phase difference that compensates for the rotation-rate phase difference is shown in FIG. 6B signal 802. The calibration phase difference waveform together with the readjustment phase-difference modulation is shown in FIG. 6B signal 803. The total phase difference modulation is shown in signal 801. The total phase modulation waveform applied to the waves at the phase modulator (701) becomes the modulation of the total phase-difference between the waves (801) as they interfere at the detector. Also, digital values at the input of the feedback accumulator 30 correspond to the phase difference modulation, signal 801, and digital values at the output of the feedback accumulator 30 correspond to the phase modulation, signal 701.

Figure 9A:
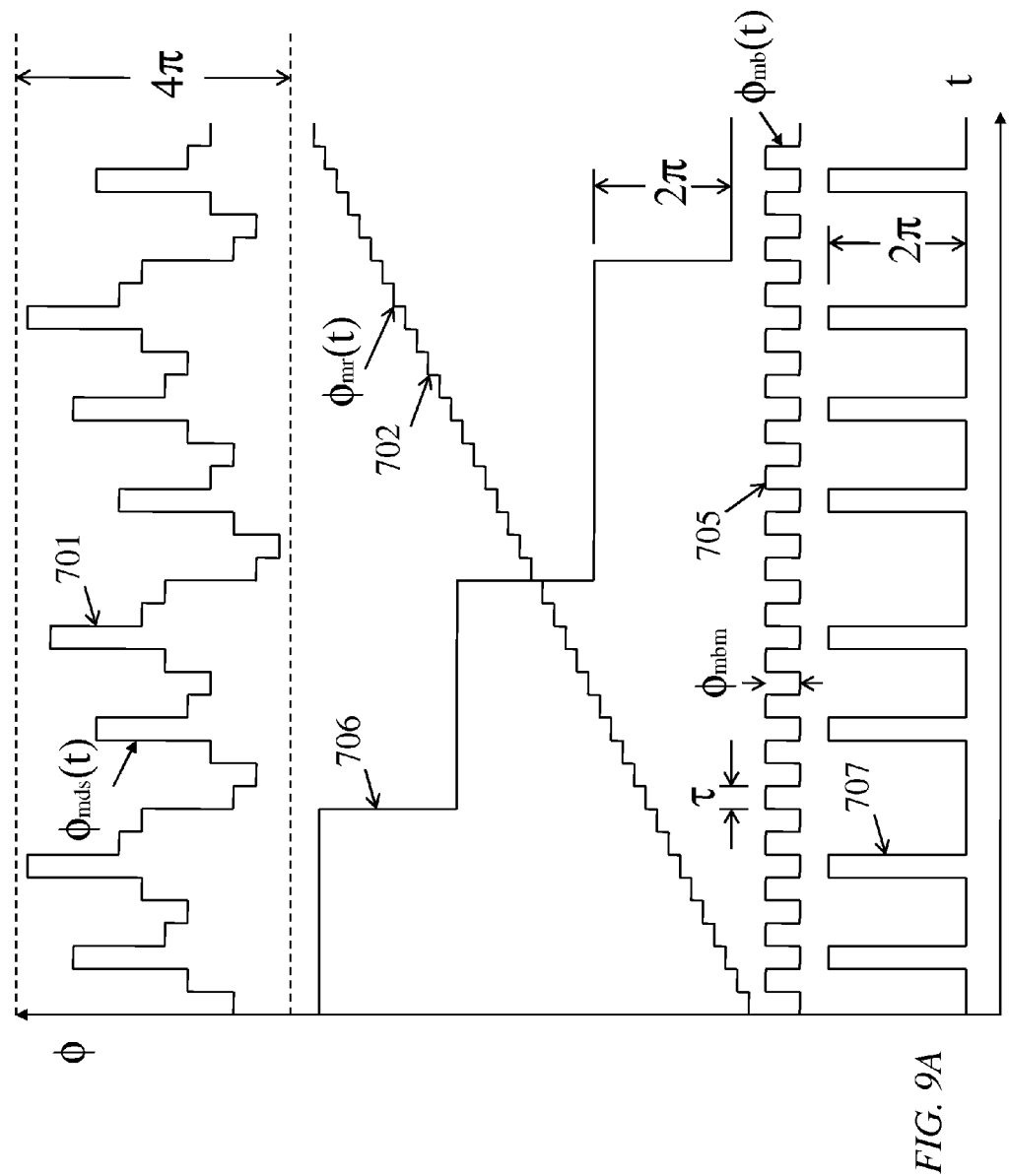
FIG. 9A shows an improved method for using inventive component waveforms to generate the same dual staircase phase modulation waveform 701 as is in FIG. 6. The same rotation-rate feedback phase-modulation component waveform 702 is used in FIG. 6 and in FIG. 7 as well as FIGS. 10 and 11 because all these figures are intended to depict the same rotation-rate induced Sagnac phase difference, and therefore they require the same rotation rate compensation. The difference between FIGS. 6 and 9A lies with the other component waveforms. The calibration waveform 707 in FIG. 7 is separated from the adjustment waveform 706 and their sum would appear to be quite different from waveform 703 in FIG. 6. This is the possible because bias modulation waveform 705 in FIG. 7 is shifted by 180 degrees compared to bias modulation waveform 704 in FIG. 6. Note that the calibration waveform takes on two values, one that is $2\pi$ greater than the other.
Figure 9B:
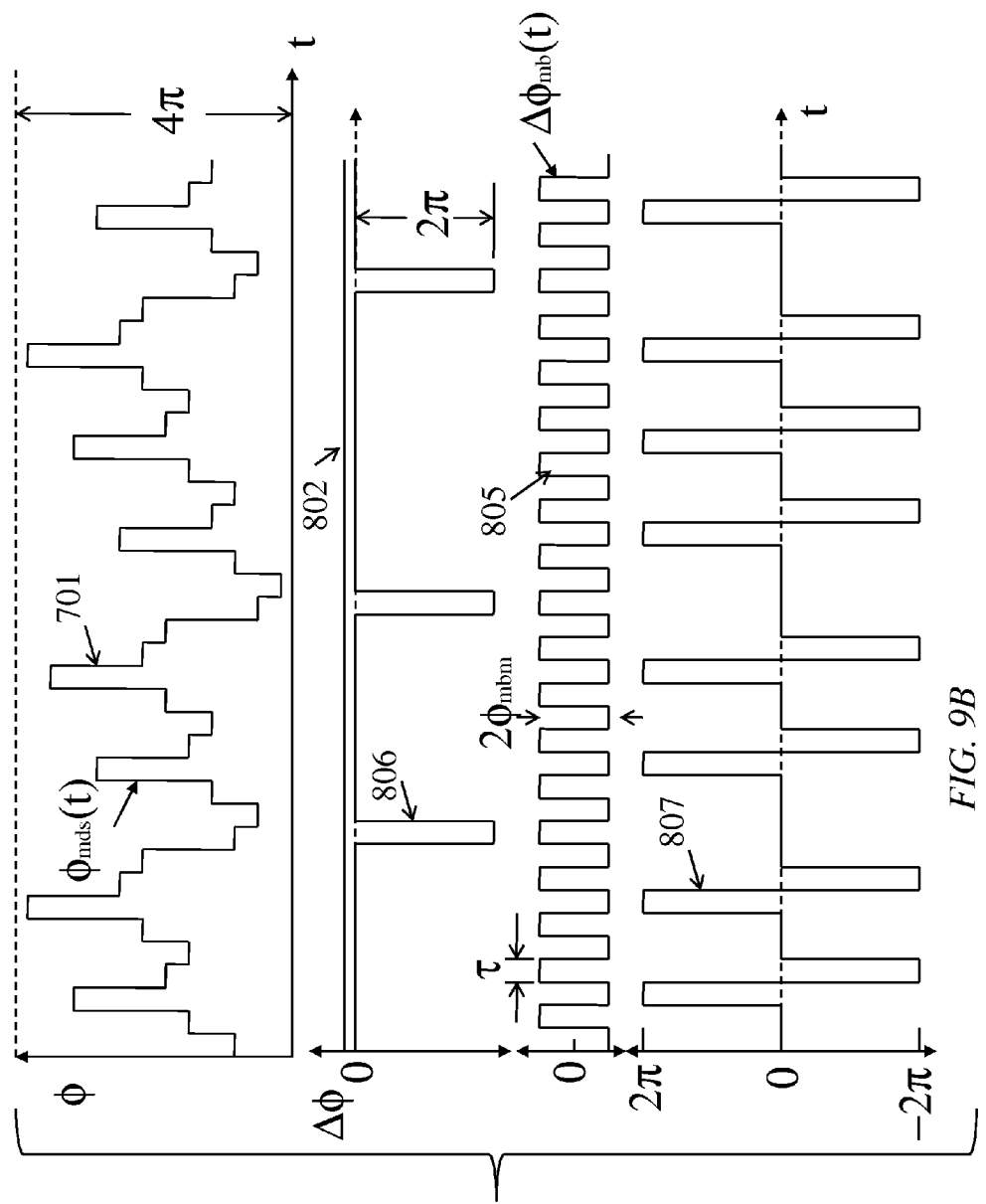
FIG. 9B shows the same dual-staircase waveform 701 as is shown in FIG. 9A, and it also shows the component waveforms that are added together to create the phase difference as is shown in FIG. 9C.
Figure 9C:
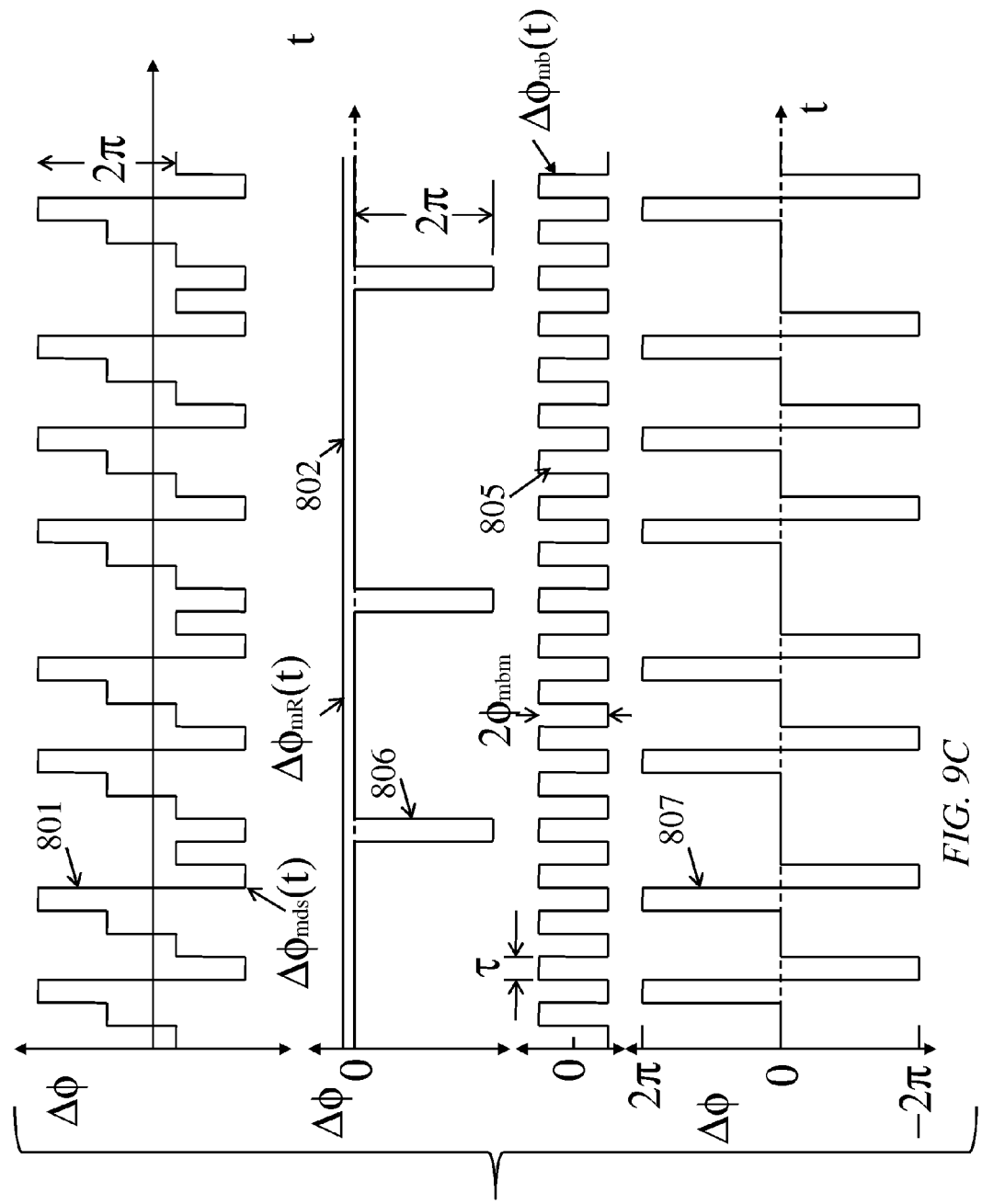
FIG. 9C shows the total dual-staircase phase-difference modulation. $\Delta\phi_{mds}(t)$ (801) and the shows this waveform separated into the same fundamental component waveforms that are shown in FIG. 9B. The sum of component waveforms shown in the lower part of FIG. 9C equals the waveform at the top of the figure. The rotation rate compensation phase-difference modulation $\Delta\phi_{mr}(t)$ (802) plus adjustment phase difference modulation $\Delta\phi_{ma}(t)$ (806) plus bias phase-difference modulation $\Delta\phi_{mb}(t)$ (805) plus calibration phase-difference modulation $\Delta\phi_{mc}(t)$ (807) equals the dual staircase phase-difference modulation (801).

The phase-difference modulation waveform 801 is unchanged in FIGS. 6C and 9C. The component phase modulation waveforms are different however: waveform 805 in FIG. 9C is shifted in time compared to waveform 804 in FIG. 6C and the calibration phase modulation 807 uses the values of 0, plus $2\pi$, and minus $2\pi$ instead of the values of plus $\pi$ and minus $\pi$ used in component waveform 803 FIG. 6C. This new way of displaying the component waveforms makes it easier to make the transition to the occasional calibration waveform shown in FIGS. 10A, 10B, 11A, and 11B. One simply zeros out some of the $2\pi$ and minus $2\pi$ phase-difference steps of waveform 807 in FIG. 9C to create the waveform 809 shown in FIG. 10B.

The phase difference modulation waveforms 801, 808, and 810 are designed to accomplish four major tasks simultaneously, and can be understood as the sum of four separate waveforms. The first of these four waveforms is a bias modulation waveform 805 (See FIGS. 9B, 9C, 10B and 11C) that enables the electronics to create a demodulated error signal that is linearly related to any additional phase differences over a limited range. The second is the RRFPDM 802 (See FIGS. 9B, 9C, 10B, and 11B) that compensates for the phase difference due to rotation. This compensation is imperfect in the short term, but by keeping the sum of the phase differences RRFPDM+$\Delta\phi_R(t)$ much less than a radian, the error is not lost and will be compensated for in the long term. The third waveform is the CFPDM 807 in FIG. 9C and 809 in FIG. 10B and 811 in FIG. 11B. These calibration phase difference modulations CFPDM all enable the measurement of the transfer function between the digital electronics and the phase difference modulation created via the phase modulator 14. They are distinctly different from the waveform 806 that adjusts the phase difference to keep it within a predetermined range. This is distinctly different from the prior art component waveform 803 in FIGS. 6B and 6C that performed both functions: it kept the total phase modulation waveform from exceeding the capability of the phase modulator 14 and it enabled the measurement of the transfer function between the digital electronics and the phase difference modulation created via the phase modulator 14. Improving this waveform is one of the purposes of this invention. Each of these three waveforms is discussed in the next few paragraphs.

Consider first the component of the phase modulation waveform that concerns the bias modulation 704. The close-loop signal processing and digital-to-analog conversion electronics 13 is configured so that the variation in the demodulated error signal as a function of the difference in phase produced between the two waves in the neighborhood of $i\pi$ is approximately linear, where i is an integer. This arrangement makes it possible to obtain a very high sensitivity of the variation in the demodulated error signal in the neighborhood of the $i\pi$ in the phase difference. It is readily appreciated that without the bias modulation the dependency of the detected optical power on the phase difference is of cosine form, and the sensitivity in the $i\pi$ neighborhood of the phase difference is very low. High sensitivity is obtained by adding a bias modulation signal $\phi_{mb}(t)$ to the control signal for the phase modulator. The preferred bias phase modulation signal is a square wave with period equal to $2\tau$ and peak-to-peak amplitude $\phi_{mbm}$. This creates a phase difference modulation with the same period $2\tau$, but with twice the amplitude alternating back and forth from $+\phi_{mbm}$ to $-\phi_{mbm}$. The demodulated signal is of sine form that is linear in the neighborhood of $i\pi$, where i is any integer or zero.

Consider next the component of the phase modulation waveform that concerns the rotation rate feedback 702. The function of the processing electronics, herein signal processor 13, is likewise to generate a phase difference 802 that is equal and opposite the phase difference created by the rotation rate. That is to say that when the rotation rate introduces a phase difference between the two waves in the interferometer, this difference produces a variation in the signal emitted by the detector 11 provoking, via the signal processor 13 and the phase modulator 14, an action that is equally and oppositely directed to the phase shift produced initially, so that the sum of these two phase differences is brought back to the null value. For this purpose, signal processor 13 generates a staircase negative feedback signal 702. Each step has duration of $\tau$ and a step height that is on average equal to the phase difference due to rotation rate.

Consider next the component of the phase modulation waveform that is for control of the modulation amplitude. Signal processor 13 is configured to add a third phase difference modulation component waveform 806 that shifts alternately between zero and either $2\pi$ or minus $2\pi$ depending upon the direction of rotation.

Consider a fourth component of the phase modulation waveform that is used to measure the transfer function between digital values and actual phase modulation. Signal processor 13 is configured to add this fourth waveform component (807 in FIG. 9C, 809 in FIG. 10B, and 811 in FIG. 11B) that shifts the operating phase difference alternately between values of zero and $2\pi$ in one direction for duration $\tau$ and then $2\pi$ in the other direction on a subsequent $\tau$ and back to zero. In the preferred embodiment of the invention the swing to minus $2\pi$ occurs right after the swing to plus $2\pi$. The total phase difference, including the bias modulation, is then $2\pi-\phi_{mbm}$ or $\phi_{mbm}-2\pi$. Thus the total phase difference including the bias modulation shifts between the four values: $\pm\phi_{mbm}$ and $2\pi-\phi_{mbm}$ and $\phi_{mbm}-2\pi$. If $\phi_{mbm}=\pi/2$, then the four values are $3\pi/2$, $\pi/2$, $-\pi/2$, and $-3\pi/2$. These four points are especially useful because they represent the steepest slopes of the interferogram closest to the phase difference of zero. Therefore the highest sensitivity of the signal to phase difference variations occurs around these phase difference values. The amount of time spent on each value is $\tau$ if the bias modulation period is $2\tau$.

The four components of the phase modulation are synchronous with each other. The constant portions occur at the same time, and likewise the transitions from one constant value to another also coincide in time.

The relationship between the digital signal entering the feedback accumulator 30 and the phase difference modulation of the counter-propagating waves has a simple explanation if the update rate of the accumulator matches the time delay, $\tau$, between the wave that takes the short path from phase modulator 14 to the detector 11 and the other counter-propagating wave that takes the long path. Basically the transformation of phase modulation to phase difference modulation reverses the affect of the accumulation performed in the feedback accumulator 30.

Phase-difference modulation waveform 808 of FIG. 10B is the sum of the four component waveforms 802, 805, 806, 809. These include the square wave bias modulation phase difference $\Delta\phi_{mb}(t)$ (805) with the phase difference peak amplitude of $\phi_{mbm}=\pi/2$ (FIG. 10B), the rotation-rate phase difference modulation $\Delta\phi_{mR}$ (802) equal to plus $\pi/6$, to compensate for the phase difference due to rotation, the calibration feedback phase difference modulation CFPDM (809) and the waveform adjustment phase-difference modulation 806. The latter also keeps the total modulation waveform within a predetermined range. The total phase-difference modulation has a long-term average value of zero as is necessary to keep the phase modulator or the drive electronics from exceeding their capability. The phase difference modulation 808 will assume the sequence of values of $\pi/2$, $3\pi/2$, $-3\pi/2$, and $-\pi/2$ when the rotation rate is zero. When the rotation rate is nonzero the total phase difference, the sum of the phase difference modulation and the Sagnac phase difference, will assume the same values but with a modification of the sequence. The sequence must change to keep the average value of the phase difference modulation zero, and thus keep the phase modulation within its designated $4\pi$ range.

Figure 10A:
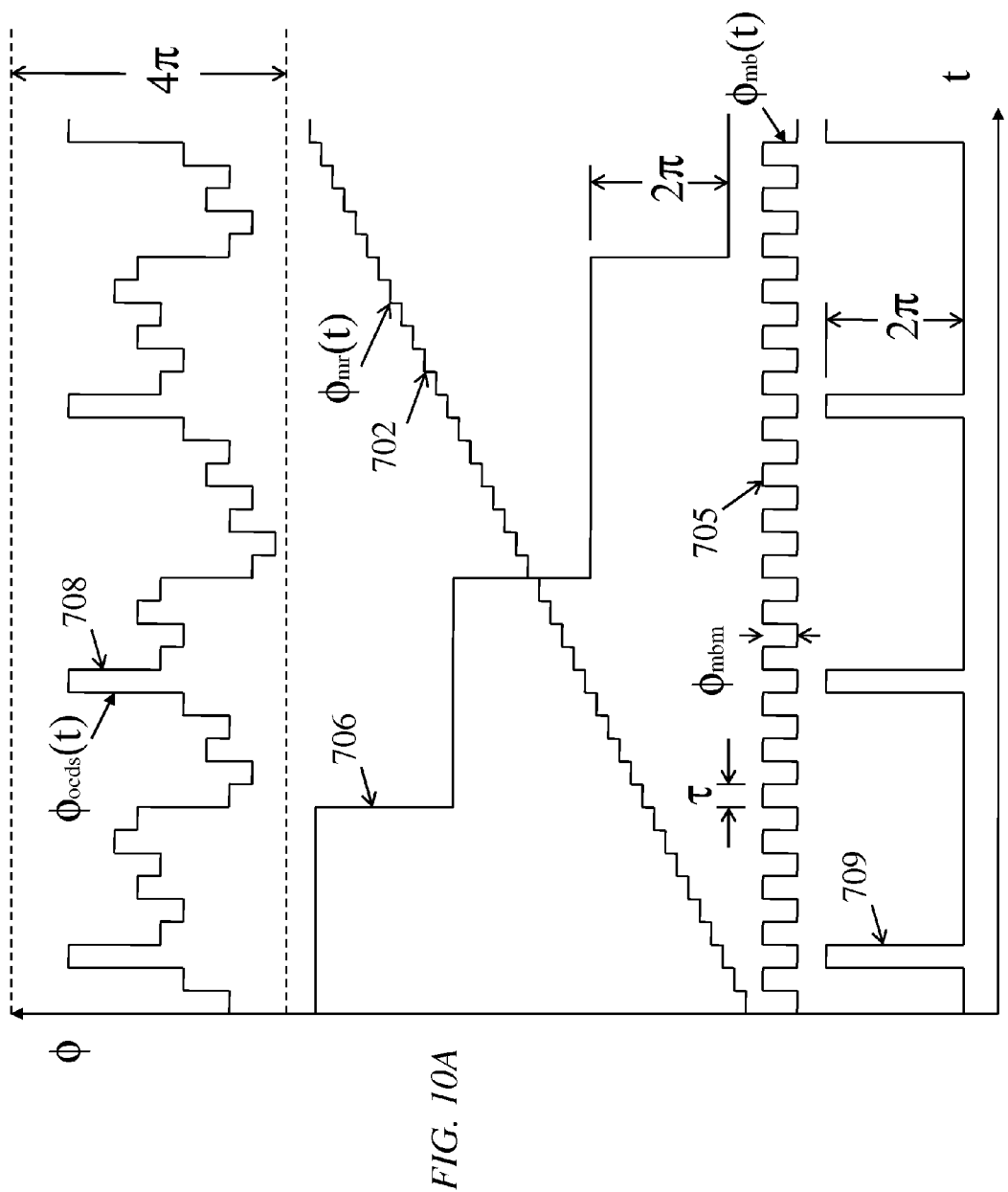
FIG. 10A shows waveforms employed in an occasional calibration phase modulation process for a Sagnac interferometer. Note the similarities between component waveforms of FIG. 10A and those of FIG. 9A Waveforms 702, 705, and 706 are unchanged. The difference is that the calibration steps in waveform 709 in FIG. 10A occur less often than the waveform 707 in FIG. 9A.
Figure 10B:
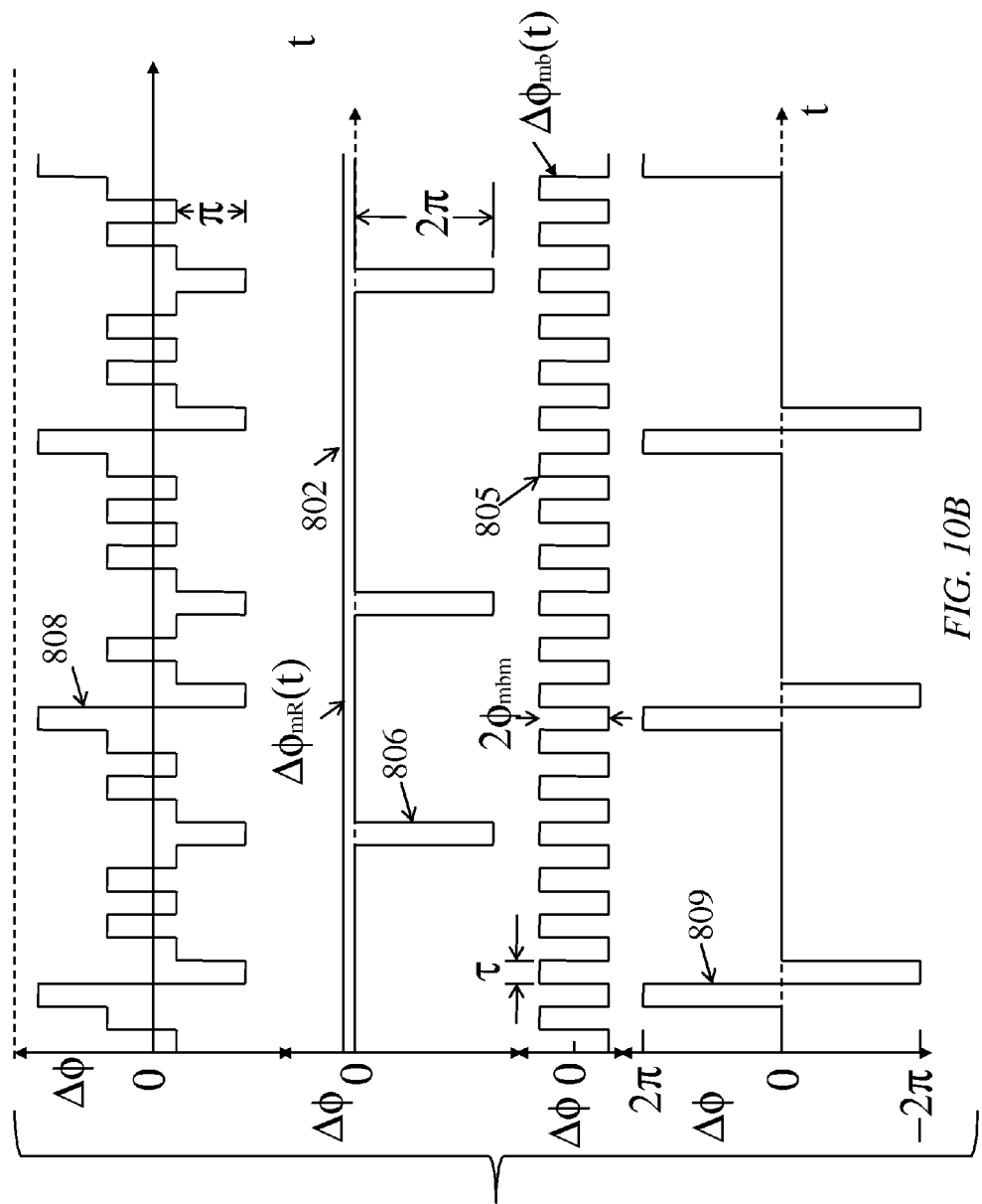
FIG. 10B shows phase difference modulation that results from the phase modulation waveforms of FIG. 10A. The phase modulation waveform 708 creates the phase-difference modulation 808; and the phase modulation waveform 702 creates the phase-difference 802; and the phase modulation waveform 706 creates the phase-difference 806; and the phase modulation waveform 705 creates the phase-difference 805; and the phase modulation waveform 709 creates the phase difference 809. Of course, the component phase difference waveforms are added to create the total phase-difference modulation. That is, waveform 802 plus waveform 806 plus waveform 805 plus waveform 809 equals waveform Note the similarities between component waveforms of FIG. 10B and those of FIG. 9C Waveforms 802, 805, and 806 are unchanged. The difference is that the calibration steps in waveform 809 in FIG. 10B occur less often than the waveform 807 in FIG. 9C.

FIG. 10A shows phase modulation 708 and phase modulation components 702, 705, 706 and 709. These correspond directly to FIG. 10B phase-difference modulation 808 and phase-difference modulation components 802, 805, 806 and 809.

Referring now to FIGS. 6A and 9A, identical waveforms 701 and 702 exist in both figures, while the waveform 705 in FIG. 9A is shifted 180 degrees to waveform 704 of FIG. 6A. This makes the component waveform 706 plus 707 look quite different than the component waveform 703 of FIG. 6A. We can also compare corresponding phase-difference component waveforms in FIGS. 6C and 9C. Component phase-difference waveforms 807 in FIG. 9C assumes the values $+2\pi$, $-2\pi$, and 0 compared to waveform 803 in FIG. 6C using the values of $+\pi$, $-\pi$. Yet summing waveforms 802, 803, and 804 yields the same waveform 801 as summing 802 plus 805 plus 806 plus 807. In FIGS. 6A and 9, accumulating waveform 801 once per $\tau$ gives waveform 701. In FIGS. 10A and 10B, accumulating waveform 808 once per $\tau$ gives waveform 708. Waveform 708 is a sequence of 2 or more steps up, followed by a sequence of 2 or more steps down, in addition to sequences of back and forth of up-steps and down-steps. In FIGS. 9 and 10 a calibration phase-difference modulation sequence of 0, $+2\pi$, $-2\pi$, and 0 plus bias phase-difference modulation of $+\pi/2$, $-\pi/2$, $+\pi/2$, $-\pi/2$, respectively becomes $+\pi/2$, $+3\pi/2$, $-3\pi/2$, −π/2, and shifting from phase-difference modulation to phase modulation this correlates to phase modulation starting with zero of +π/2, +2π, +π/2, 0 respectively. This creates the two steps up and two steps down in the dual-staircase waveform 708. An additional two steps down are occasionally taken to keep the waveform within range. This is accomplished with a −2π followed by a 0 in phase difference waveform 806. The reason for going through the trouble of using the component waveforms shown in FIG. 9 instead of the seemingly simpler component waveforms of FIG. 6, is that using the FIG. 9 component waveforms will help us describe the invention shown in FIG. 10.

Referring now to FIG. 10, waveforms for an occasional calibration phase-difference modulation for Sagnac interferometer are shown. The phase-modulation waveform 708 shown in FIG. 10A is designed to accomplish three main tasks: first it makes the interferometer sensitive to small changes in Sagnac phase difference due to rotating the gyroscope (this is commonly referred to as biasing the interferometer); second, it supplies a feedback phase difference to keep the interferometer sensitive to small changes in rotation rate; and third, it supplies the calibration modulation necessary to keep the digital electronics calibrated with respect to the Sagnac phase difference being measured. The calibration task is accomplished by the occasional dual-staircase waveform where two steps are taken in one direction and then two steps are taken in the other. In prior art, the dual-staircase sections of the waveform occur one after another. The prior art approach has led to an unacceptable amount of measurement error in some gyroscopes. Dispersing the dual-staircase sections as shown reduces this error.

Thus it is most advantageous to the operation of the occasional dual-staircase waveform to replace the steady repetition of the sequence 0, +2π, −2π, and 0 in waveform 807 of FIG. 9C with zero most of the time and only the occasional 0, +2π, −2π, and 0 shown in waveform 809 in 10B. The waveforms 808 and 708 are likewise changed. This reduces errors due to the use of the dual-staircase by the fraction of the time spent on a dual staircase sequence. Thus, for example, if this sequence is used only half the time, then the particular error associated with the sequence will be reduced by half. As a further example, if the dual-staircase sequence is used 1% of the time, then the error will be reduced by a factor of 100. The invention leads to a significant improvement tin measurement accuracy in some FOGs.

Referring now to FIG. 12A-FIG. 12D, there shown is a phase modulation waveform of the present invention (FIG. 12A) applied at the phase modulator together with the Sagnac phase difference becomes the total phase difference (FIG. 12B) as the two waves from the interferometer are brought together. The interferogram (FIG. 12C) shows how the phase difference is transformed into optical power vs. time (FIG. 12D).

FIG. 12A shows a copy of the occasional calibration modulation waveform 708 shown in FIG. 10(*a*). It is applied to both of the counter-propagating waves as they pass through the phase modulator 14. After passing through the phase modulator one of the counter-propagating waves takes τ seconds longer to reach the detector than the other. Thus of the two waves arriving simultaneously at the detector one received its phase modulation τ seconds before the other. The phase modulation, $\phi_{mds}(t)$, is thereby converted to the phase difference, $\Delta\phi_{mds}(t)$, modulation by the interferometer delays according to the formula $\Delta\phi_{mds}(t)=\phi_{mds}(t)-\phi_{mds}(t-\tau)$. The phase difference modulation adds to the Sagnac phase difference to create the total phase difference between the counter-propagating waves at the detector, shown in FIG. 12B. The total phase difference is locked to the four phase difference values $\pm\phi_{mbm}$ and $2\pi-\phi_{mbm}$ and $\phi_{mbm}-2\pi$ by the closed-loop electronics. If $\phi_{mbm}=\pi/2$ then the four phase difference values are −3 π/2, −π/2, π/2, and 3 π/2 as is shown in FIG. 12B. The graph of optical power vs. phase difference between the interfering waves is shown in FIG. 12C and is known as the interferogram. The interferogram, FIG. 12C, maps the total phase difference to detected optical power, and therefore it maps the total phase difference vs. time, FIG. 12B, into the detected optical power vs. time, FIG. 12D.

The two control loops, the rotation-rate control loop and the calibration control loop, are used to maintain the phase difference values by keeping the detected power flat in time not including the short transients that occur as a result of the transitions from one phase difference value to another. FIG. 13A-FIG. 13C show how an error in the rotation-rate digital value will affect the total phase difference (FIG. 13A) and the detected optical power, (FIG. 13C). The rotation-rate demodulator will multiply the detector optical power by the square wave reference signal and will create the rotation-rate error signal that will be used by the rotation-rate accumulator to correct the rotation-rate digital value. Once the rotation-rate digital value is correct the power signal will be flat and the rotation-rate error signal will be zero.

FIG. 14A-FIG. 14C show how an error in the 2πDS will affect the total phase difference (FIG. 14A) and the detected optical power (FIG. 14C). The calibration demodulator will multiply the detector optical power by the calibration reference signal and will create the calibration error signal that will be used by the calibration accumulator to correct the 2πDS.

Figure 11A:
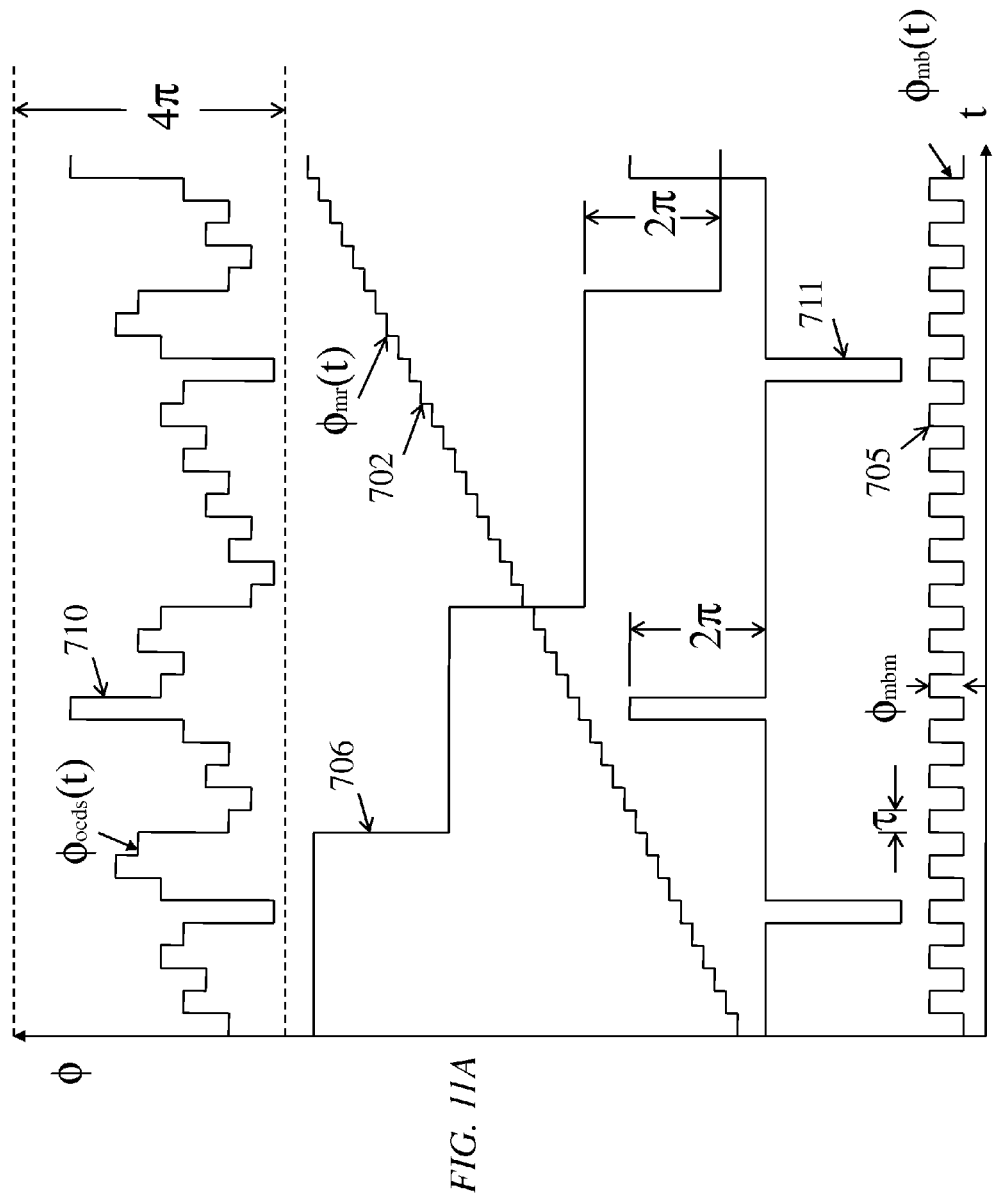
FIG. 11A shows an alternative embodiment of the occasional calibration phase modulation wherein steps of plus and minus $2\pi$ phase shifts are employed.
Figure 11B:
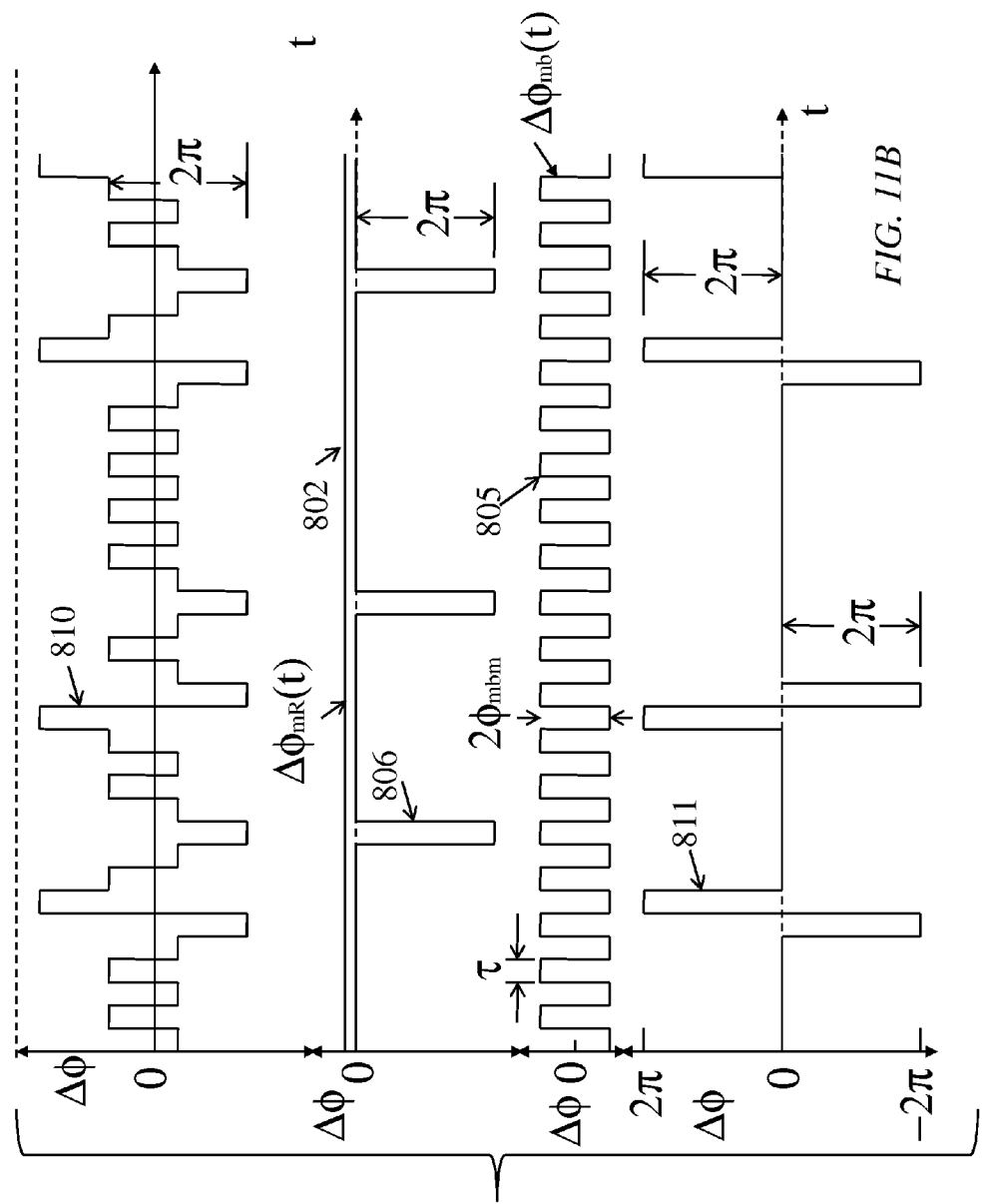
FIG. 11B shows the phase difference modulation resulting from the phase modulation of FIG. 11A.

Referring now to FIGS. 11A and 11B, there shown is a modified sequence for a calibration waveform. In an alternate embodiment, the sequence may be modified to sometimes use 0, +2π, −2π, and 0 and other times use 0, −2π, +2π, and 0 in waveform 808 as shown in FIG. 11B. This can reduce total phase modulation required and thus reduce the voltage necessary to effect the modulation.

In the prior art dual-staircase approach a dual-staircase calibration phase-difference modulation is created within the calibration control loop. This new dual-staircase calibration phase-difference modulation can be described in terms of two sequences. Each sequence contains a series of phase-difference steps and each step has duration of τ. A first sequence consists of one or more of a first group of phase-difference steps. The first group is a zero step followed by a 2π step. A second sequence is one or more of a second group of steps. The second group consists of a minus 2π step followed by a zero step. The calibration phase-difference modulation then consists of one after the other of first sequences followed by second sequences as shown in waveform 809 (FIG. 10B). Adding bias phase-difference modulation of waveform 805 and rotation-rate nulling phase difference waveform 802 to the dual-staircase calibration phase-difference modulation of waveform 809 and adjustment waveform 806 gives a dual-staircase total phase difference modulation of waveform 808. Passing this dual-staircase total phase difference modulation through the feedback accumulator 30 makes a dual staircase phase modulation of 708 (FIG. 10A). The calibration loop in the dual staircase approach determines a digital value that corresponds to a fixed phase shift. The calibration loop of the dual staircase approach measures the relationship between the digital values of the signal processing and a phase modulation of 2π radians, but it does not impose a relationship as in a calibration loop of a prior art staircase-and-fall-back approach.

In the case of the occasional calibration approach a third sequence is added to the calibration phase difference modulation. The third sequence consists of pairs of null steps. Thus the occasional-calibration-approach-calibration-phase-difference modulation consists of a first sequence, a second sequence and a third sequence. The calibration is accomplished by the first and second sequences. The third sequence can include a large number of pairs. The third sequence does not contribute any error to the rotation rate measurement that the first and second sequences might contribute.

The occasional calibration waveform dual-staircase signal processing of the present invention is significantly better than the prior-art staircase-and-fall-back or dual staircase approaches. The prior art approaches have led to an unacceptable amount of measurement error in some gyroscopes. The occasional-calibration-dual-staircase approach is much better than the staircase-and-fallback approach because the feedback gain of the calibration loop is not proportional to the rotation rate. The occasional-calibration-dual-staircase approach is much better than the standard dual-staircase approach because by dispersing the dual-staircase sequences as shown, for example, in waveform 808 (FIG. 10A) and error present in some fiber optic gyroscopes (FOGs) is significantly reduced.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A method for modulating the phase of a pair of optical waves in a Sagnac interferometer, the method comprising:
    generating a phase modulation signal (701), where the phase modulation signal is the summation of phase modulation component signals including
        (i) a bias phase modulation component signal (705) having a selected bias modulation amplitude and waveform,
        (ii) a rotation-rate feedback phase modulation component signal (702),
        (iii) a waveform adjust component signal (706) for keeping the phase modulation within a predetermined range, and
        (iv) a calibration feedback phase modulation component signal (707), wherein said calibration feedback phase modulation component alternates back and forth between substantially constant values, a first substantially constant value and a second substantially constant value that is either $2\pi$ greater than the first substantially constant value or $2\pi$ less than the first substantially constant value, and the first substantially constant value is held for first time durations and the second substantially constant value is held for second time durations.

2. The method of claim 1 where the second time durations are equal to a transit time $\tau$.

3. The method of claim 2 where first time durations are integer multiples of $\tau$.

4. The method of claim 3 where transitions between the first substantially constant value and the second substantially constant value occur at nearly the same time as transitions between one bias modulation level and another bias modulation level.

5. The method of claim 3 where second durations occur at the same time as bias modulation values of opposite sign.

6. The method of claim 5 where the first time durations are greater than ten times the second time durations.

7. The method of claim 5 where the first time durations are greater than one hundred times the second time durations.

8. The method of claim 1 where said second substantially constant values occur at times that are substantially different from the transitions of the waveform adjust component signal (706).

9. A method of modulating phase of light waves in a Sagnac interferometer according to a waveform of phase modulation versus time (708) comprising constant values for a duration of time and transitions between constant values, and a combination of a transition and an immediately following constant value is referred to as a phase-modulation step; and a phase-modulation up-step is any transition and constant value wherein said transition is from a lesser constant value to a greater constant value, and a phase-modulation down-step comprises a transition and constant value wherein said transition is from a greater value to a lesser value, and said phase modulation waveform includes three sequences of phase steps:
    i. a first sequence comprises a plurality of up-steps one after another,
    ii. a second sequence comprises a plurality of down-steps one after another, and
    iii. a third sequence comprises both up-steps and down steps and alternates between single up-steps and single down-steps, an example of a third sequence is a repeating series of an up-step, followed by a down-step.

10. The method of claim 9 in which all three said sequences are present to measure a given non-zero Sagnac phase difference.

11. The method of claim 9 in which a step duration including a transition of short duration plus the duration of the constant value is substantially equal to one $\tau$.

12. The method of claim 10 in which a step duration including a transition of short duration and the duration of the constant value is substantially equal to one $\tau$, where $\tau$ is an optical wave propagation time difference.

13. A method for modulating the phase difference between a pair of optical waves exiting a Sagnac interferometer, wherein a phase modulation signal (701) is applied to a phase modulator (14) to modulate the phase of said pair of waves while said pair of waves propagate in opposite directions through phase modulator (14) and because the phase modulator (14) is not in the center of the Sagnac interferometer said phase modulation causes a modulation of the phase difference between the two waves as they exit the interferometer and arrive at detector 11, the phase-difference modulation (801) is a sum of the following phase-difference components:
    (i) a bias phase-difference modulation component (805) having a selected bias modulation amplitude and waveform,
    (ii) a rotation-rate feedback phase-difference modulation component (802),
    (iii) a waveform adjust phase-difference component (806) that takes on nonzero values during adjustment time periods for keeping the phase modulation within a predetermined range, and
    (iv) a calibration feedback phase-difference modulation component (807);
activating said calibration feedback phase-difference modulation component (807) during first time periods; and
deactivating said calibration feedback phase-difference modulation component (807) during second time periods during which time said calibration feedback phase-difference modulation component is substantially zero.

14. The method of claim 13 where said first time periods occur at times that are different from said adjustment time periods.

15. The method of claim 13 where the activation duration and the deactivation duration are substantially independent of rotation rate.

16. The method of claim 13 wherein the activation of said calibration feedback phase modulation coincides with the steps of the waveform adjust component signal less than 50 percent of the time.

17. The method of claim 13 wherein the activation of said calibration feedback phase difference modulation coincides with the steps of the waveform adjust component signal less than 25 percent of the time.

18. The method of claim 16 wherein the second duration is longer than the first duration on average.

19. The method of claim 13 wherein the second duration is on average more than four times as long as the first duration.

20. The method of claim 14 wherein the calibration modulation component signal (809, 811) is activated less than 10 percent of the time period.

21. A method for modulating the phase of a pair of optical waves in a Sagnac interferometer, the method comprising:
applying a phase modulation with at least one phase modulator (14), said phase modulation including sequences of steps in phase, one sequence after another, including:
(i) a first sequence that alternates between up-steps and down-steps, an up-step followed by a down-step where the sequence repeats multiple times,
(ii) a second sequence that comprises two or more steps in one direction, followed immediately by two or more steps in the other direction, two up-steps followed by two down-steps.

22. The method of claim 21 wherein said phase modulation signal alternates between said first sequences and said second sequences.

23. The method of claim 21 wherein the duration of each step is approximately equal to τ, where τ is an optical wave propagation time difference.

24. The method of claim 23 wherein more time is spent during the first sequences than the second sequences.

25. The method of claim 23 wherein total number of steps in first sequences is at least twice the total number of steps in second sequences.

26. The method of claim 23 wherein total number of steps in first sequences is at least ten times the total number of steps in second sequences.

27. The method of claim 23 wherein total number of steps in first sequences is at least one hundred times the total number of steps in second sequences.

28. The method of claim 23 wherein the second sequences will sometimes begin with up-steps immediately followed by down-steps and sometimes begins with down-steps immediately followed by down-steps.

29. The method of claim 28 wherein the second sequences will alternately between begin with up-steps and beginning with down-steps.

30. The method of claim 21 wherein the duration of each step is approximately equal to τ/N where N is an odd integer and where τ is an optical wave propagation time difference.

31. A method for modulating the phase of a pair of optical waves in a Sagnac interferometer, the method comprising:
applying a phase modulation with at least one phase modulator (14), said phase modulation comprising sequences of steps of phase, one sequence after another, including:
(i) a first sequence that alternates between up-steps and down-steps, an up-step followed by a down-step which in turn is followed by an up-step, where the sequence repeats multiple times,
(ii) a second sequence that comprises two or more up-steps in a row,
(iii) a third sequence that comprises two or more down-steps in a row.

32. The method of claim 31 wherein an integer number of first sequences is followed by a second sequence which in turn is immediately followed by a third sequence.

33. The method of claim 31 wherein an even number of steps is used in the second and third sequences.

34. A method for modulating the phase of a pair of optical waves in a Sagnac interferometer, the method comprising:
applying a phase modulation with at least one phase modulator (14), said phase modulation comprising sequences of steps in phase, one sequence after another, including:
(i) a first sequence that that comprises one up-step followed by one down-step,
(ii) a second sequence that that comprises one down-step followed by one up-step,
(iii) a third sequence that comprises two or more up-steps in a row,
(iiii) a fourth sequence that comprises two or more down-steps in a row.

35. The method of claim 10 in which an even number of up steps and an even number of down-steps are used.

36. The method of claim 35 in which the number of up steps is equal to the number of subsequent down-steps.

37. The method of claim 36 in which the number of up steps and the number of subsequent down-steps is equal to two.

* * * * *